(12) United States Patent
Mori et al.

(10) Patent No.: US 10,700,814 B2
(45) Date of Patent: Jun. 30, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Masahito Mori, Kanagawa (JP); Tomoya Yamaura, Tokyo (JP); Takeshi Itagaki, Saitama (JP); Eisuke Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 190 days.

(21) Appl. No.: 15/743,917

(22) PCT Filed: Jul. 1, 2016

(86) PCT No.: PCT/JP2016/069606
§ 371 (c)(1),
(2) Date: Jan. 11, 2018

(87) PCT Pub. No.: WO2017/026198
PCT Pub. Date: Feb. 16, 2017

(65) Prior Publication Data
US 2018/0212714 A1 Jul. 26, 2018

(30) Foreign Application Priority Data
Aug. 11, 2015 (JP) .................................. 2015-158856

(51) Int. Cl.
*H04L 1/00* (2006.01)
*H04L 29/08* (2006.01)
(Continued)

(52) U.S. Cl.
CPC ............ *H04L 1/0083* (2013.01); *H04L 1/009* (2013.01); *H04L 1/0043* (2013.01);
(Continued)

(58) Field of Classification Search
CPC ... H04L 1/0083; H04L 1/0043; H04L 1/0072; H04L 1/009; H04L 1/0057; H04L 29/10; H04L 69/321; H04L 69/324; H04W 80/02
See application file for complete search history.

(56) References Cited

U.S. PATENT DOCUMENTS 8,769,369 B2 * 7/2014 Hwang ................. H03M 13/05
714/752
9,473,264 B2 * 10/2016 Yang ..................... H04L 1/0057
(Continued)

FOREIGN PATENT DOCUMENTS

JP 11-177536 A 7/1999
JP 2006-101061 4/2006
(Continued)

OTHER PUBLICATIONS

International Search Report dated Aug. 30, 2016 in PCT/JP2016/069606 filed Jul. 1, 2016.

Primary Examiner — Christine T. Tu
(74) Attorney, Agent, or Firm — Xsensus LLP

(57) ABSTRACT

Data communication is performed appropriately.
An information processing apparatus includes a control unit. In a case of transmitting data by using wireless communication, the control unit performs control of performing transmission while including determination information with which a device in a transmission destination of the data determines in a data link layer whether to pass the data to a higher layer of the data link layer into the data. Also, in a case of receiving data by using wireless communication, the control unit performs control of determining whether to pass the data to a higher layer of a data link layer on the basis of information included in the data (determination information that can be grasped in data link layer).

6 Claims, 20 Drawing Sheets

(51) Int. Cl.
*H04L 29/10* (2006.01)
*H04W 80/02* (2009.01)
(52) U.S. Cl.
CPC ............ *H04L 1/0072* (2013.01); *H04L 29/10* (2013.01); *H04L 69/321* (2013.01); *H04L 69/324* (2013.01); *H04L 1/0057* (2013.01); *H04W 80/02* (2013.01)

(56) References Cited

U.S. PATENT DOCUMENTS

| 9,730,094 B2 * | 8/2017 | Kairouz ............... H04L 1/0007 |
| 2010/0097924 A1 | 4/2010 | Yamaguchi et al. |
| 2012/0082030 A1 | 4/2012 | Yasuda |
| 2012/0117446 A1 | 5/2012 | Taghavi Nasrabadi et al. |

FOREIGN PATENT DOCUMENTS

| JP | 2007-515832 | | 6/2007 |
| JP | 2007-515833 | | 6/2007 |
| JP | 2014-502094 | A | 1/2014 |
| WO | 2009/075097 | A1 | 6/2009 |
| WO | 2010/110356 | A1 | 9/2010 |

* cited by examiner

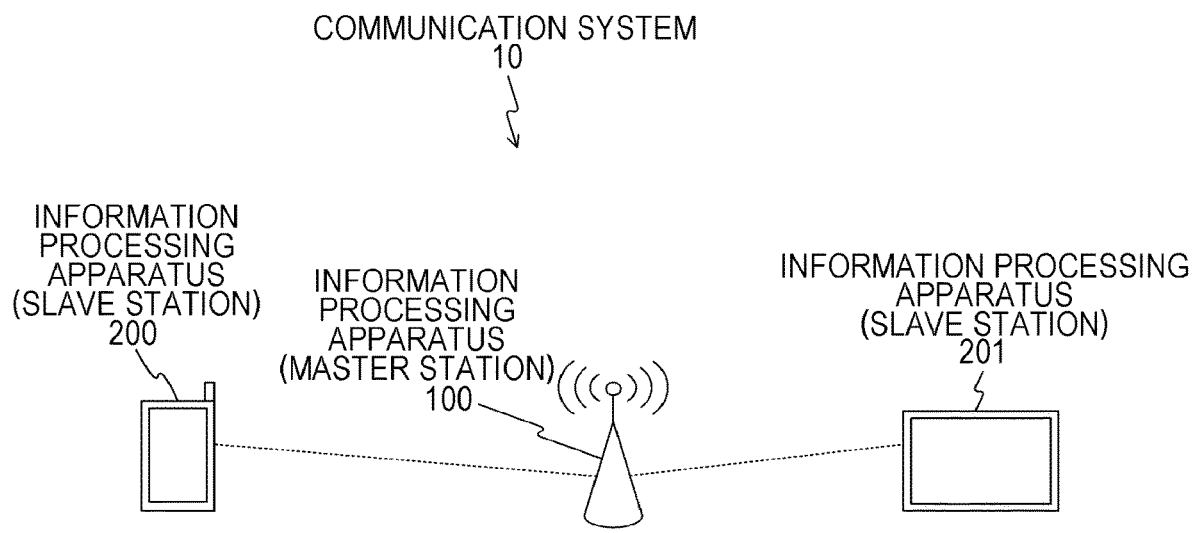
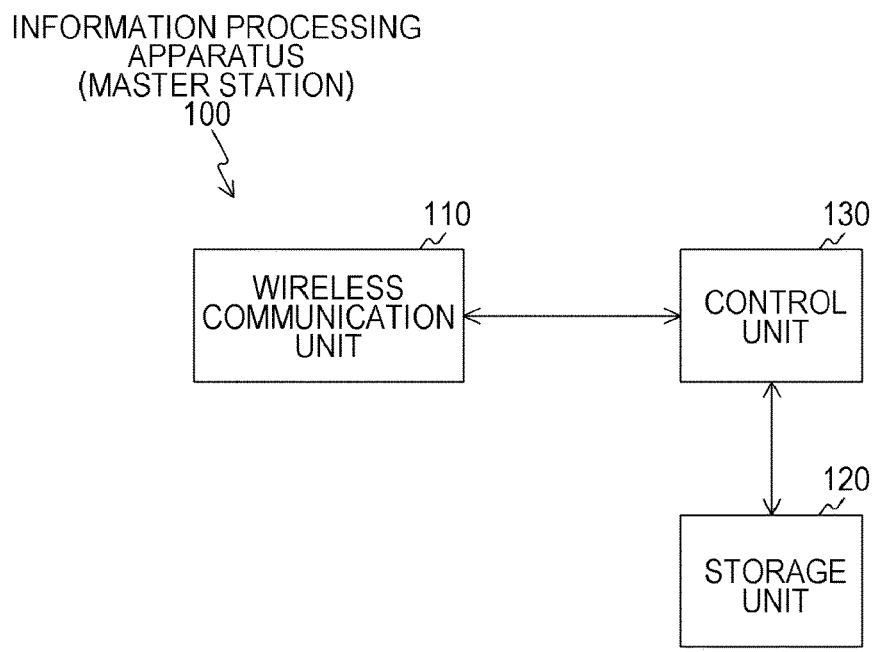

CONFIGURATION EXAMPLE OF WIRELESS COMMUNICATION UNIT 110 OF INFORMATION
PROCESSING APPARATUS (MASTER STATION) 100 (CONFIGURATION EXAMPLE OF RECEPTION UNIT)

FIG. 6
CONFIGURATION EXAMPLE OF IEEE802.11 FRAME
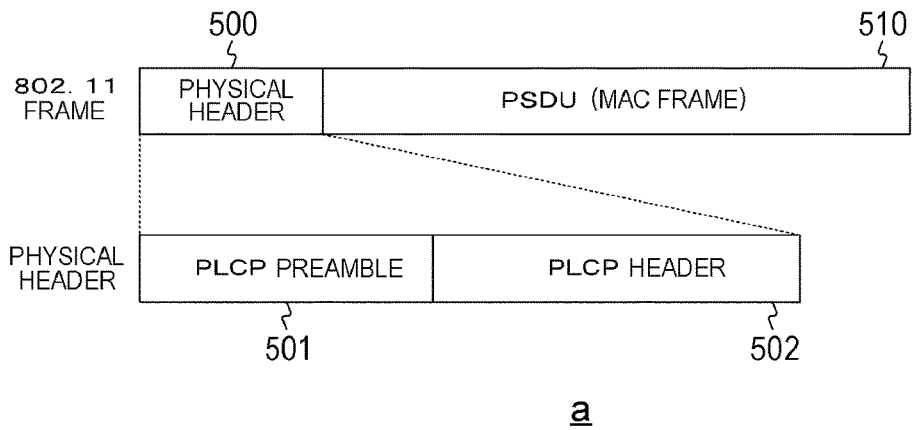
a
CONFIGURATION EXAMPLE OF PSDU (MAC FRAME)
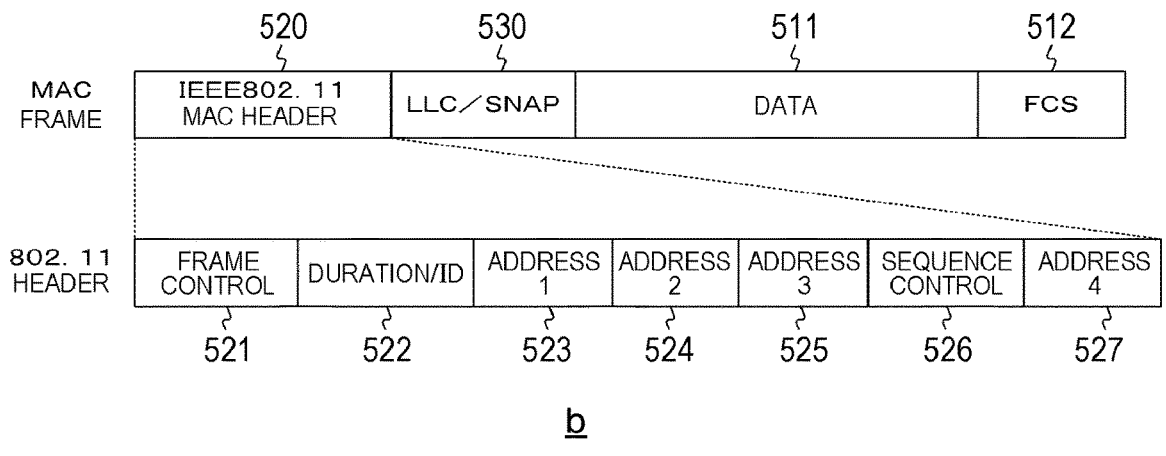
b
CONFIGURATION EXAMPLE OF LLC/SNAP
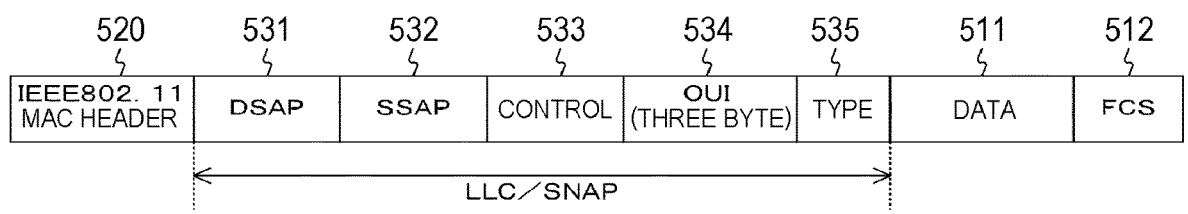
c Payload Type field values

| Protocol name | Payload type | Subclause |
|---|---|---|
| Remote Request/Response | 1 | 12. 10. 3 |
| TDLS | 2 | 10. 22. 2 |
| L2 FEC Pre-information | 3 | NEWLY DEFINED |
| L2 FEC Redundancy Code | 4 | NEWLY DEFINED |
| Reserved | 5-255 | |

541, 542, 543

CONFIGURATION EXAMPLE OF L2 FEC PRIOR INFORMATION FRAME

FIG. 9

EXAMPLE OF L2 FEC Coding Scheme Index

| L2 FEC CS Index (561) | Coding Method (562) | Coding Rate (563) |
|---|---|---|
| 0 | Reed−Solomon | 1/2 |
| 1 | Reed−Solomon | 2/3 |
| 2 | Reed−Solomon | 3/4 |
| 3 | Reed−Solomon | 4/5 |
| 4 | BCH | 1/2 |
| 5 | BCH | 2/3 |
| 6 | BCH | 3/4 |
| 7 | BCH | 4/5 |

FIG. 10
Valid type and subtype combinations

| Type value b3 b2 (571) | Type description (572) | Subtype value b7 b6 b5 b4 (573) | Subtype description (574) |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110 | Timing Advertisement |
| 00 | Management | 0111 | Reserved |
| 00 | Management | 1000 | Beacon |
| 00 | Management | 1001 | ATIM |
| 00 | Management | 1010 | Disassociation |
| 00 | Management | 1011 | Authentication |
| 00 | Management | 1100 | Deauthentication |
| 00 | Management | 1101 | Action (575) |
| 00 | Management | 1110 | Action No Ack |
| 00 | Management | 1111 | Reserved |
| 01 | Control | 0000-0110 | Reserved |
| 01 | Control | 0111 | Control Wrapper |
| 01 | Control | 1000 | Block Ack Request(BlockAckReq) |
| 01 | Control | 1001 | Block Ack(BlockAck) |
| 01 | Control | 1010 | PS-Poll |
| 01 | Control | 1011 | RTS |
| 01 | Control | 1100 | CTS |
| 01 | Control | 1101 | ACK |
| 01 | Control | 1110 | CF-End |
| 01 | Control | 1111 | CF-End+CF-Ack |
| 10 | Data | 0000 | Data |
| 10 | Data | 0001 | Data+CF-Ack |
| 10 | Data | 0010 | Data+CF-Poll |
| 10 | Data | 0011 | Data+CF-Ack+CF-Poll |
| 10 | Data | 0100 | Null(no data) |
| 10 | Data | 0101 | CF-Ack(no data) |
| 10 | Data | 0110 | CF-Poll(no data) |
| 10 | Data | 0111 | CF-Ack+CF-Poll(no data) |
| 10 | Data | 1000 | QoS Data (576) |
| 10 | Data | 1001 | QoS Data+CF-Ack |
| 10 | Data | 1010 | QoS Data+CF-Poll |
| 10 | Data | 1011 | QoS Data+CF-Ack+CF-Poll |
| 10 | Data | 1100 | QoS Null(no data) |
| 10 | Data | 1101 | Reserved |
| 10 | Data | 1110 | QoS CF-Poll(no data) |
| 10 | Data | 1111 | QoS CF-Ack+CF-Poll(no data) |
| 11 | Reserved | 0000-0110 | Reserved |

FIG. 11

FORMAT EXAMPLE OF CASE WHERE L2 FEC PRIOR INFORMATION
AND REDUNDANCY SIGNAL ARE TRANSMITTED IN Action Frame Table — L2FEC Pre—information frame Action field format

| Order | Information |
|---|---|
| 1 | Category (X) |
| 2 | L2FEC Action(0) |
| 3 | Sequence Number of 1st MAC Frame |
| 4 | Number of MAC Frames |
| 5 | L2 FEC Coding Scheme Index |
| 6 | Length of Code Word | a

Table — L2FEC Redundancy Code frame Action field format

| Order | Information |
|---|---|
| 1 | Category (X) |
| 2 | L2FEC Action(1) |
| 3 | Redundancy Code | b

FIG. 12

FORMAT EXAMPLE OF CASE WHERE L2 FEC PRIOR INFORMATION
AND REDUNDANCY SIGNAL ARE TRANSMITTED IN Action Frame Figure—Action field

| Category | Action Details |
|---|---|
| 1 | variable |

Octets:

a

Table—Category Values

| Code | Meaning |
|---|---|
| X | L2FEC |

(NEW VALUE)

b

Table—L2FEC Action field values

| Value | Meaning |
|---|---|
| 0 | L2FEC Pre-information |
| 1 | L2FEC Redundancy Code | c

EXAMPLE OF QUEUING OF L2 FEC PRIOR INFORMATION FRAME AND REDUNDANCY SIGNAL (ECC) FRAME

FIG. 15
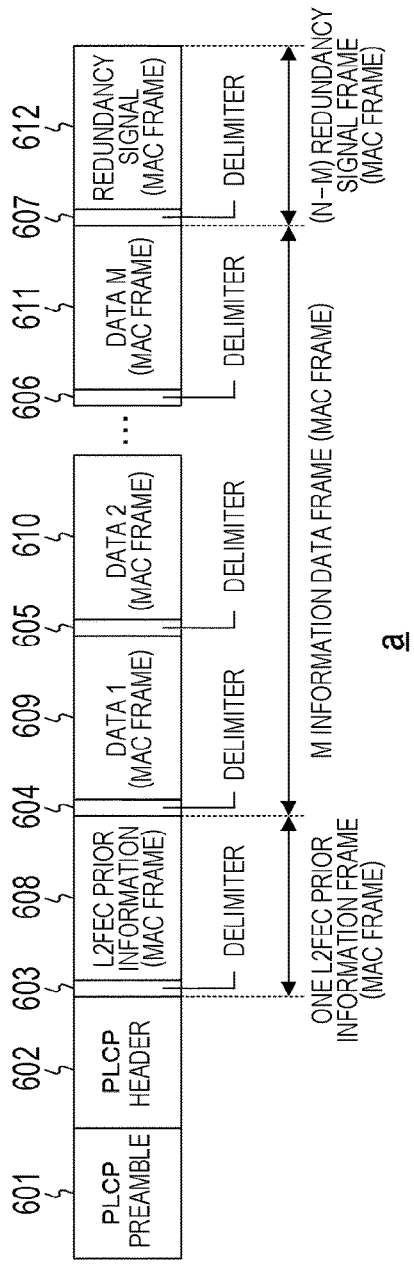
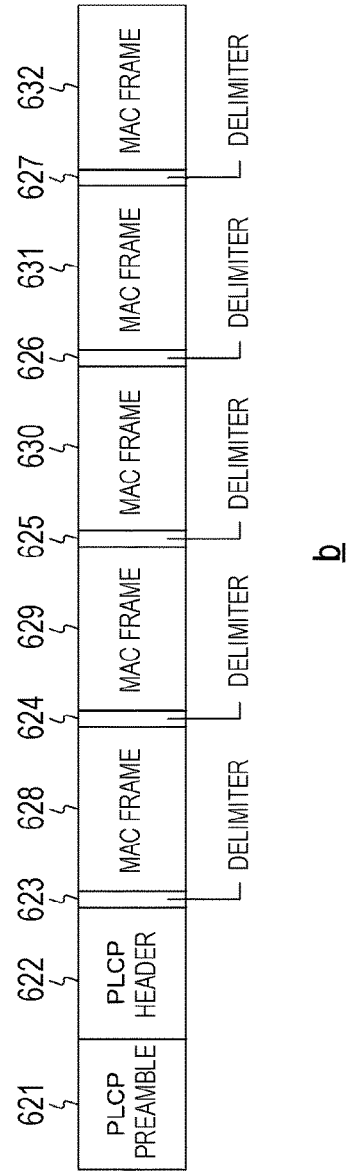

FIG. 17 OPERATION EXAMPLE ON TRANSMISSION SIDE
(EXAMPLE OF FRAME TRANSMISSION PROCESSING USING A-MPDU, AND BLOCK ACK REQUEST PROCESSING)

FIG. 19

EXAMPLE OF STORING L2 FEC PRIOR INFORMATION
AND REDUNDANCY SIGNAL INTO ONE FRAME

| 581 | 582 | 583 | 584 | 585 | 586 |
|---|---|---|---|---|---|
| IEEE802.11 MAC HEADER | LLC/SNAP | L2 FEC Pre Info Table | Redundancy Code ID | Redundancy Code | FCS |

INFORMATION PROCESSING APPARATUS, INFORMATION PROCESSING METHOD, AND PROGRAM

TECHNICAL FIELD

The present technology relates to an information processing apparatus. More specifically, the present technology relates to an information processing apparatus and an information processing method to exchange information by using wireless communication, and to a program that causes a computer to execute the method.

BACKGROUND ART

Recently, a high-definition moving image is distributed in broadcasting. Also, along with development of a communication technology, a high-definition moving image is distributed in a wired/wireless communication network. In this distribution of a moving image, a real-time property is important in addition to reliability.

For example, there is the Institute of Electrical and Electronic Engineers (IEEE) 802.11 as a standard related to a wireless local area network (LAN). For example, in the IEEE 802.11, there is a mechanism of a retransmission request for recovery of a dropped packet, or a mechanism of a forward error correcting code in a physical layer (layer 1 (L1)) in order to improve reliability of communication (see, for example, Non-Patent Document 1).

However, there is no mechanism of an error correcting code in a MAC layer (layer 2 (L2)). Thus, in a case where a code error generated due to interference of a packet or the like is not corrected in an L1, an acknowledgement (ACK) is not transmitted back and the packet is retransmitted.

Also, with respect to a hierarchy of a layer 3 (L3) or higher, a technology of providing an error correction function in a higher layer which technology is called an application layer error correction (AL-FEC) is proposed. It is possible to recover from an error in a higher layer by using this technology. However, even if it is possible to recover from an error in a higher layer, it is not possible to recover from an error in an L2. Thus, it is not possible to transmit an ACK back to a communication partner. Thus, even in a case where it is possible to recover from an error in a higher layer, retransmission is performed by the communication partner.

Also, for example, a data transmission/reception system that determines a forward error correction capability on the basis of a transmission error rate of data and that assigns, to the transmitted data, a forward error correcting code corresponding to the forward error correction capability is proposed (see, for example, Patent Document 1).

Also, for example, a technology of controlling an operation of a plurality of communication layers in a hierarchized communication system is proposed (see, for example, Patent Document 2 and 3).

CITATION LIST

Patent Document

Patent Document 1: WO 2009/075097 A
Patent Document 2: JP 2007-515833 W
Patent Document 3: JP 2007-515832 W

Non-Patent Document

Non-Patent Document 1: IEEE STANDARDS ASSOCIATION. IEEE Std 802.11-2012, Retrieved Jan. 30, 2015, from http://standards.ieee.org/getieee802/download/802.11-2012.pdf

SUMMARY OF THE INVENTION

Problems to be Solved by the Invention

In the above-described conventional technologies, in order to recover a dropped packet, it is necessary to retransmit the packet if a code error is not corrected in an L1 in a case where the IEEE 802.11 standard is employed. However, in an application such as moving image distribution, a real-time property may be lost in a case where a packet is retransmitted.

Also, for example, in order to perform error correction in an L2, it is important to appropriately set a coding method or a format and to avoid unnecessary L2 retransmission. As described, in a case where data communication such as moving image distribution is performed by utilization of wireless communication, it is important to avoid unnecessary L2 retransmission and to appropriately perform data communication.

The present technology is generated in view of such a condition and is to appropriately perform data communication.

Solutions to Problems

The present technology is provided to solve the above problems, and a first aspect thereof is an information processing apparatus including a control unit that performs, in a case of transmitting data by using wireless communication, control of performing transmission while including determination information with which a device in a transmission destination of the data determines in a data link layer whether to pass the data to a higher layer of the data link layer into the data, an information processing method thereof, and a program causing a computer to execute the method. With this arrangement, in a case where data is transmitted by utilization of wireless communication, transmission is performed with determination information with which a device in a transmission destination of the data determines in a data link layer whether to pass the data to a higher layer being included in the data.

Also, in this first aspect, the control unit may perform control of performing transmission while including the determination information into a frame designating a predetermined value in LLC/SNAP. With this arrangement, transmission is performed with determination information being included in a frame designating a predetermined value in LLC/SNAP.

Also, in this first aspect, the control unit may perform control of performing transmission while adding a frame, which includes as the determination information a redundancy signal to perform error correction in the data link layer, to a data frame in which a frame including the data is coded in a unit of a MAC frame. With this arrangement, transmission is performed with a frame including a redundancy signal to perform error correction in a data link layer being added to a data frame in which a frame including data is coded in a unit of a MAC frame.

Also, in this first aspect, the control unit may perform control of performing transmission while including the redundancy signal into a frame designating a value, which indicates that the redundancy signal is included, in LLC/SNAP. With this arrangement, transmission is performed with a redundancy signal being included in a frame designating a value, which indicates that the redundancy signal is included, in LLC/SNAP.

Also, in this first aspect, the control unit may perform control of performing transmission while including the redundancy signal into an action frame. With this arrangement, transmission is performed with a redundancy signal being included in an action frame.

Also, in this first aspect, the control unit may perform control of performing transmission while adding, in front of a frame to transmit the data, accompanying information that is information used in performance of error correction in the data link layer and that includes a coding method of a redundancy signal to perform the error correction in the data link layer, a coding rate of the redundancy signal, and object frame information to specify an object frame to be an object of the error correction in the data link layer. With this arrangement, transmission is performed with accompanying information including a coding method of a redundancy signal, a coding rate of the redundancy signal, and object frame information being added in front of a frame to transmit data.

Also, in this first aspect, the control unit may perform control of performing transmission while putting the determination information and the accompanying information into a queue of an access category that is the same with that of the object frame. With this arrangement, transmission is performed with determination information and accompanying information being put in a queue of an access category that is the same with that of an object frame.

Also, in this first aspect, the control unit may perform control of performing transmission in the order of a frame including the accompanying information, the object frame, and a frame including the determination information. With this arrangement, a frame including accompanying information, an object frame, and a frame including determination information are transmitted in this order.

Also, in this first aspect, the control unit may perform control to perform wireless communication with the device in the transmission destination according to an IEEE 802.11 standard. With this arrangement, wireless communication is performed with a device in a transmission destination according to the IEEE 802.11 standard.

Also, a second aspect of the present technology is an information processing apparatus including a control unit that performs control of determining, in a case of receiving data by using wireless communication, whether to pass the data to a higher layer of a data link layer on the basis of determination information that is information included in the data and that can be grasped in the data link layer, an information processing method thereof, and a program causing a computer to execute the method. With this arrangement, in a case where data is received by utilization of wireless communication, it is determined whether to pass the data to a higher layer on the basis of information included in the data (determination information that can be grasped in data link layer).

Also, in this second aspect, the control unit may acquire the determination information on the basis of a value designated by LLC/SNAP in a received frame. With this arrangement, determination information is acquired on the basis of a value designated by LLC/SNAP in a received frame.

Also, in this second aspect, the control unit may perform, in a case of determining to pass the data to the higher layer on the basis of the determination information, control of transmitting an acknowledgement for notification that the data is received correctly to a device of a transmission source which has transmitted the data. With this arrangement, in a case where it is determined that data is passed to a higher layer, an acknowledgement for notification that the data is received correctly is transmitted to a device of a transmission source which has transmitted the data.

Also, in this second aspect, the control unit may perform, in a case where loss correction of the data is performed on the basis of the determination information, control of transmitting an acknowledgement for notification that the data is received correctly to a device of a transmission source which has transmitted the data. With this arrangement, in a case where loss correction of data is performed, an acknowledgement for notification that the data is received correctly is transmitted to a device of a transmission source which has transmitted the data.

Effects of the Invention

According to the present technology, data communication can be performed appropriately. Note that an effect described herein is not necessarily limited and may be any of the effects described in the present disclosure.

BRIEF DESCRIPTION OF DRAWINGS

FIG. 1 is a view illustrating an example of a whole configuration of a communication system 10 in an embodiment of the present technology.

FIG. 2 is a block diagram illustrating a functional configuration (logical configuration) example of an information processing apparatus (master station) 100 in the embodiment of the present technology.

FIG. 6 is a view illustrating a configuration example of an IEEE 802.11 frame exchanged between information processing apparatuses in the embodiment of the present technology.

FIG. 9 is a view illustrating an example of a definition of an L2 FEC Coding Scheme Index in the L2 FEC prior information frame exchanged between the information processing apparatuses in the embodiment of the present technology.

FIG. 10 is a view illustrating a kind of a frame exchanged between the information processing apparatuses in the embodiment of the present technology.

FIG. 11 is a view illustrating a format example of an Action Frame exchanged between the information processing apparatuses in the embodiment of the present technology.

FIG. 12 is a view illustrating a format example of an Action Frame exchanged between the information processing apparatuses in the embodiment of the present technology.

FIG. 15 is a view illustrating a configuration example of an aggregation frame exchanged between the information processing apparatuses in the embodiment of the present technology.

FIG. 19 is a view illustrating a configuration example of a frame exchanged between the information processing apparatuses in the embodiment of the present technology.

MODE FOR CARRYING OUT THE INVENTION

Figure 3:
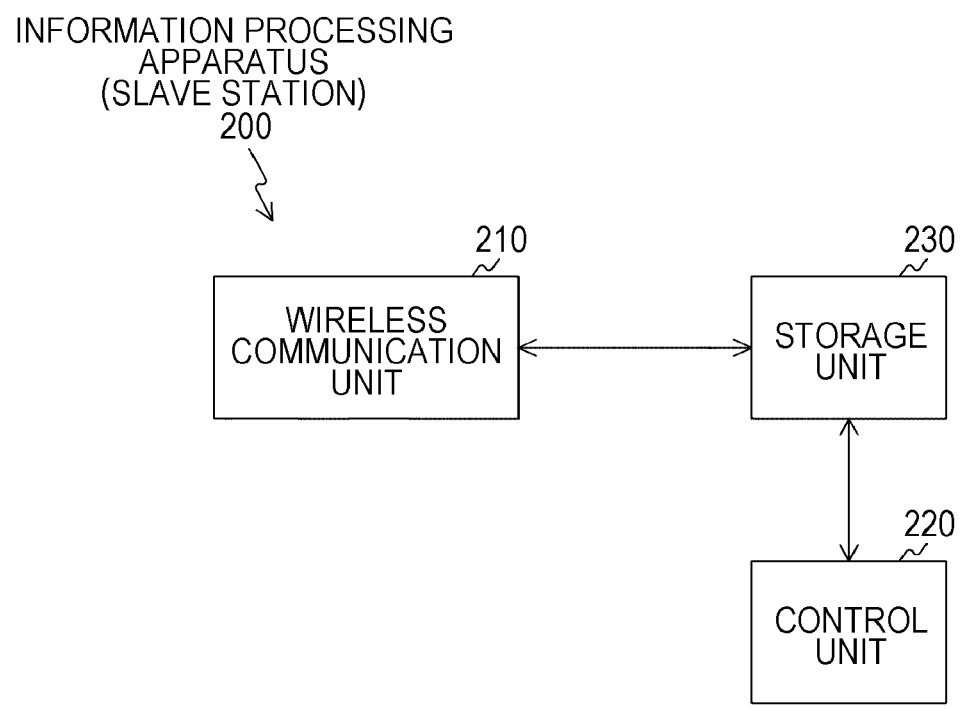
FIG. 3 is a block diagram illustrating a functional configuration (logical configuration) example of an information processing apparatus (slave station) 200 in the embodiment of the present technology.

In the following, a mode to carry out the present technology (hereinafter, referred to as embodiment) will be described. A description will be made in the following order.

1. Embodiment (example in which a device on a transmission side includes an L2 FEC, with which a device on a reception side determines in a data link layer whether to pass data to a higher layer, into the data and performs transmission thereof and the device on the reception side determines whether to pass the data to the higher layer on the basis of the L2 FEC included in the data)

2. Application Example

1. Embodiment

[Configuration Example of Communication System]

FIG. 1 is a view illustrating an example of a whole configuration of a communication system 10 in an embodiment of the present technology. The communication system 10 includes an information processing apparatus (master station) 100, and information processing apparatuses (slave station) 200 and 201.

Each of the information processing apparatus (master station) 100, and the information processing apparatuses (slave station) 200 and 201 is, for example, a fixed or portable information processing apparatus (wireless communication device) having a wireless communication function. Here, the portable information processing apparatus is, for example, an information processing apparatus such as a smartphone, a mobile phone, a tablet terminal, or a wearable terminal. Also, the fixed information processing apparatus is, for example, an information processing apparatus such as an access point or a base station.

Also, for example, each of the information processing apparatus (master station) 100, and the information processing apparatuses (slave station) 200 and 201 has a communication function compliant with a wireless local area network (LAN) standard of Institute of Electrical and Electronic Engineers (IEEE) 802.11. A communication system realized by this communication function is, for example, a wireless local area network (LAN). For example, wireless fidelity (Wi-Fi), an ad hoc network, or a mesh network can be used as this wireless LAN.

Also, the information processing apparatus (slave station) 200 and the information processing apparatus (slave station) 201 are connected to the information processing apparatus (master station) 100.

Also, the information processing apparatus 100 functions as a master station (master device), and the information processing apparatuses 200 and 201 function as slave stations (slave device). Also, the information processing apparatus 100 functions as an access point, and the information processing apparatuses 200 and 201 function as subordinate devices of the access point. Note that a system configuration of an object of the embodiment of the present technology is not limited to these. Also, in FIG. 1, an example of a communication system including one wireless master station and two wireless slave stations is illustrated. However, the number of wireless master stations and wireless slave stations is not limited to these. Also, a communication system in the embodiment of the present technology is not limited to these. For example, the embodiment of the present technology can be applied to a different communication system. For example, the embodiment of the present technology can be applied to a communication system in which a plurality of devices is mutually connected by one-to-one wireless communication of the plurality of devices.

[Configuration Example of Information Processing Apparatus (Master Station)]

FIG. 2 is a block diagram illustrating a functional configuration (logical configuration) example of the information processing apparatus (master station) 100 in the embodiment of the present technology.

The information processing apparatus (master station) 100 includes a wireless communication unit 110, a storage unit 120, and a control unit 130.

The wireless communication unit 110 is a wireless communication interface that mediates wireless communication between the information processing apparatus (master station) 100 and a different information processing apparatus. For example, the wireless communication unit 110 performs wireless communication with a different information processing apparatus on the basis of an instruction from the control unit 130.

The storage unit 120 stores various kinds of information and supplies the stored information to the control unit 130. For example, the storage unit 120 stores information related to setting of an L2 forward error correction (FEC) that is set by the control unit 130. Here, setting of an L2 FEC is, for example, setting of a coding method and a coding rate of an error correcting code (illustrated, for example, in FIG. 9), a result of an acknowledgement (ACK)/negative acknowledgement (NACK), and the like.

The control unit 130 controls each unit of the information processing apparatus (master station) 100 on the basis of a control program stored in the storage unit 120. For example, the control unit 130 performs control to perform wireless communication with a device in a transmission destination according to the IEEE 802.11 standard.

Also, for example, in a case of transmitting data by using wireless communication, the control unit 130 performs control of performing transmission while including, into the data, determination information with which a device in a transmission destination of the data determines in a data link layer (second layer) whether to pass the data to a higher layer of the data link layer. Here, the determination information is, for example, an L2 FEC (such as L2 FEC prior information 431 or redundancy signal 421 illustrated in d of FIG. 13).

Also, for example, the control unit 130 performs control of performing transmission while including determination information into a frame that designates a predetermined value (such as Payload type 542 illustrated in FIG. 7) in LLC/SNAP (such as LLC/SNAP 530 illustrated in b of FIG. 6).

Also, for example, in a case of receiving data by using wireless communication, the control unit 130 performs control of determining whether to pass the data to a higher layer of the data link layer on the basis of information included in the data (determination information that can be grasped in data link layer). In this case, the control unit 130 can acquire determination information on the basis of a value designated by LLC/SNAP in a received frame.

Figure 13:
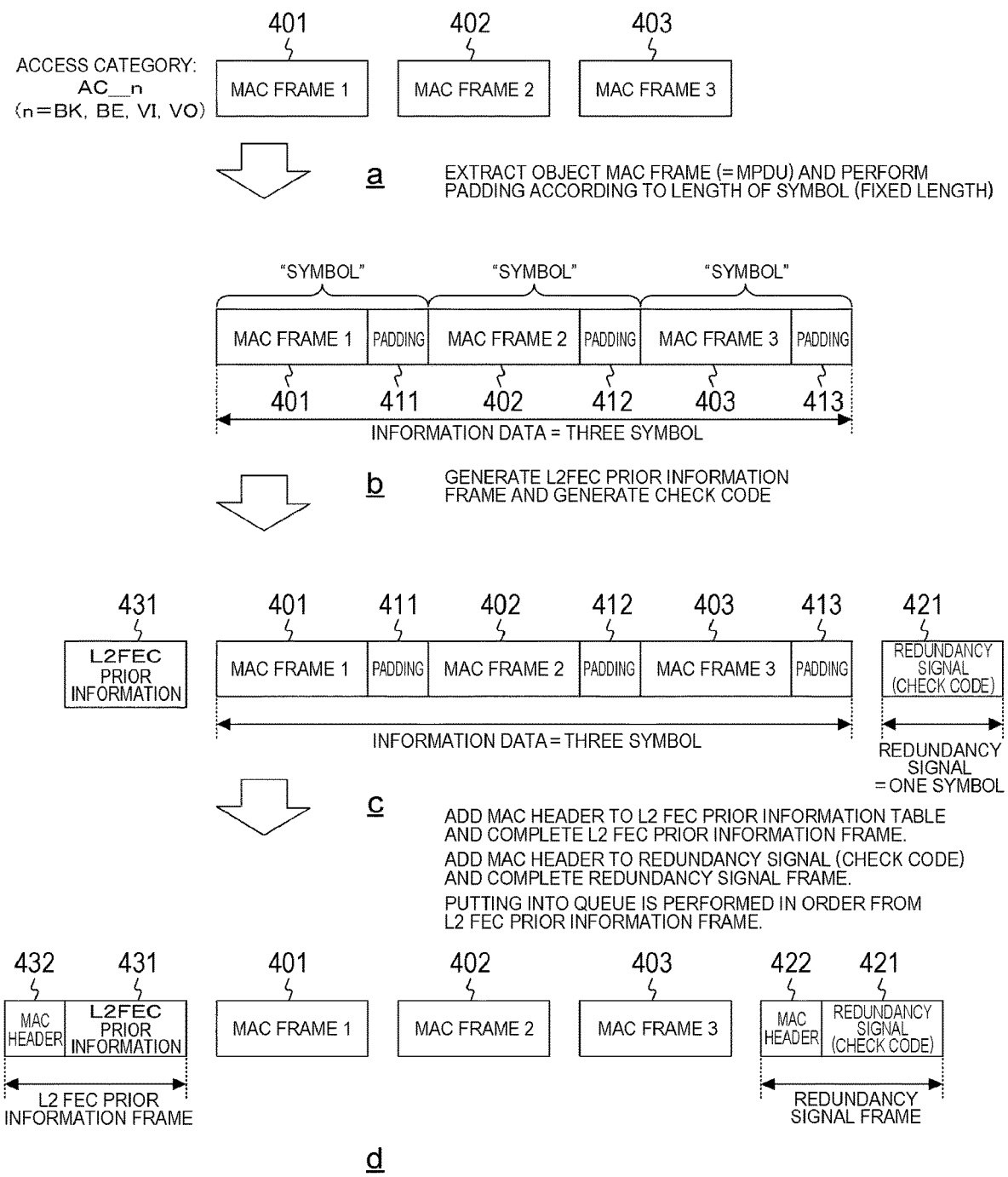
FIG. 13 is a view schematically illustrating generation processing of an L2 FEC prior information frame and generation processing of a redundancy signal frame by the information processing apparatus (slave station) 200 in the embodiment of the present technology.

Also, for example, the control unit 130 has a function of controlling operation of an L2 FEC (such as L2 FEC prior information 431 or redundancy signal 421 illustrated in d of FIG. 13) in the information processing apparatus (master station) 100. For example, on the basis of information stored in the storage unit 120 (such as information related to previous setting of L2 FEC), the control unit 130 selects appropriate setting of an L2 FEC and performs setting with respect to the wireless communication unit 210. For example, a case where a retransmission rate becomes high with a coding rate (Coding Rate 563 illustrated in FIG. 9) being set to ¾ is assumed. In such a case, the control unit 130 can set a low coding rate (set coding rate of ⅔, for example) on the basis of information related to previous setting of an L2 FEC (retransmission rate becoming high with coding rate of ¾).

[Configuration Example of Information Processing Apparatus (Slave Station)]

FIG. 3 is a block diagram illustrating a functional configuration (logical configuration) example of the information processing apparatus (slave station) 200 in the embodiment of the present technology. Note that since a functional configuration of the information processing apparatus (slave station) 201 (functional configuration related to wireless communication) is substantially similar to that of the information processing apparatus (slave station) 200, a description thereof is omitted here.

The information processing apparatus (slave station) 200 includes a wireless communication unit 210, a storage unit 220, and a control unit 230. Note that these correspond to units with the same names in FIG. 2. Thus, a detailed description of these is omitted.

[Functional Configuration Example of Wireless Communication Unit]

Figure 4:
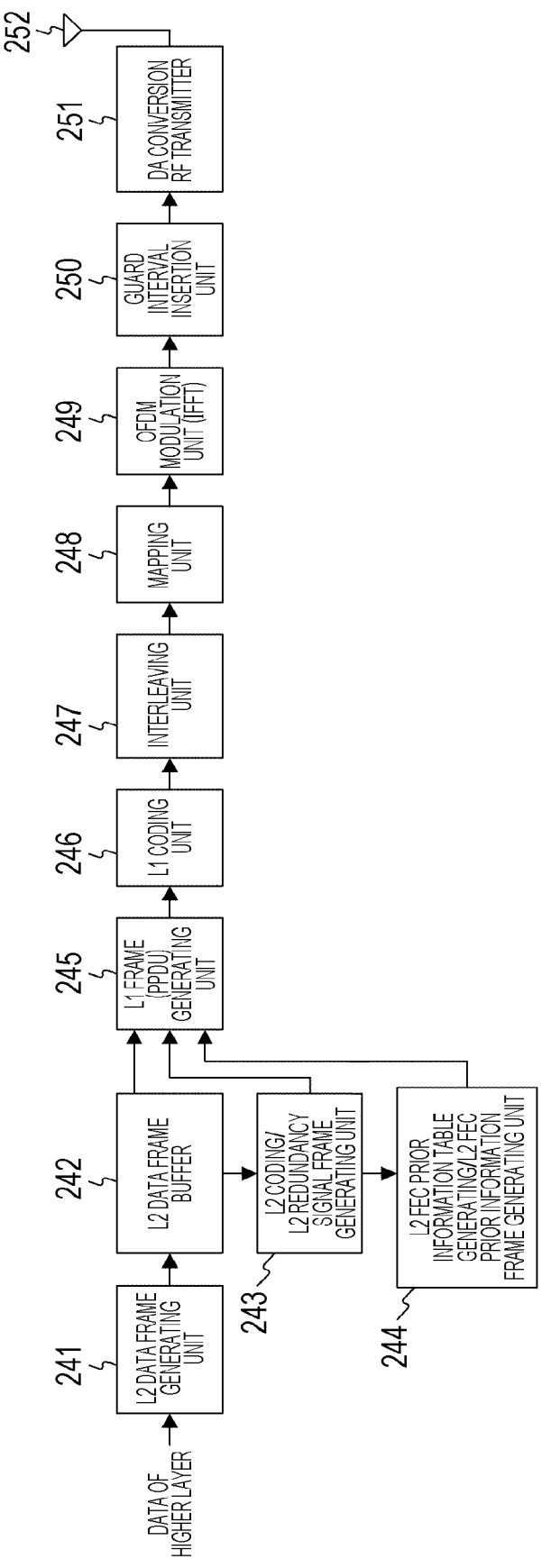
FIG. 4 is a block diagram illustrating a functional configuration example of a wireless communication unit 210 of the information processing apparatus (slave station) 200 in the embodiment of the present technology.

Next, a functional configuration example of a wireless communication unit on a transmission side (transmission unit) and that on a reception side (reception unit) will be described separately. In FIG. 4, a functional configuration example of a wireless communication unit on a transmission side (transmission unit) will be described with the wireless communication unit 210 of the information processing apparatus (slave station) 200 as an example. Also, in FIG. 5, a functional configuration example of a wireless communication unit on a reception side (reception unit) will be described with the wireless communication unit 110 of the information processing apparatus (master station) 100 as an example. Note that in FIG. 4 and FIG. 5, the wireless communication units of the information processing apparatuses will be described separately as the transmission side (transmission unit) and the reception side (reception unit). However, the wireless communication unit of each of the information processing apparatuses includes functions of both of the transmission side (transmission unit) and the reception side (reception unit).

[Functional Configuration Example of Transmission Unit]

FIG. 4 is a block diagram illustrating a functional configuration example of the wireless communication unit 210 of the information processing apparatus (slave station) 200 in the embodiment of the present technology.

Receiving data (such as transmission control protocol/Internet protocol (TCP/IP) packet) from a higher layer, the wireless communication unit 210 performs transmission processing with respect to the data. Also, in generation of an L2 frame with respect to the data, the wireless communication unit 210 generates an L2 FEC prior information frame (illustrated in FIG. 8, and d of FIG. 13) and a redundancy signal frame (illustrated in d of FIG. 13).

As a functional configuration to perform transmission processing, the wireless communication unit 210 includes an L2 data frame generating unit 241, an L2 data frame buffer 242, an L2 coding/L2 redundancy signal frame generating unit 243, an L2 FEC prior information table generating/L2 FEC prior information frame generating unit 244, an L1 frame (physical layer convergence protocol (PLCP) protocol data unit (PPDU)) generating unit 245, an L1 coding unit 246, an interleaving unit 247, a mapping unit 248, an orthogonal frequency division multiplexing (OFDM) modulation unit (inverse fast Fourier transform (IFFT)) 249, a guard interval insertion unit 250, a digital to analog (DA) conversion radio frequency (RF) transmitter 251, and an antenna 252.

The L2 data frame generating unit 241 generates a MAC frame by adding a media access control (MAC) header or the like to data received from a higher layer.

The L2 data frame buffer 242 is an unprocessed MAC frame buffer that temporarily holds the MAC frame generated by the L2 data frame generating unit 241. Then, the L2 data frame buffer 242 supplies the held MAC frame to the L2 coding/L2 redundancy signal frame generating unit 243 or the L1 frame (PPDU) generating unit 245.

The L2 coding/L2 redundancy signal frame generating unit 243 performs coding processing and processing of adding a redundancy signal with respect to the MAC frame generated by the L2 data frame generating unit 241. That is, with respect to the MAC frame generated by the L2 data frame generating unit 241, the L2 coding/L2 redundancy signal frame generating unit 243 performs L2 coding processing and generates an L2 redundancy signal frame (illustrated in d of FIG. 13).

Figures 7, 8:
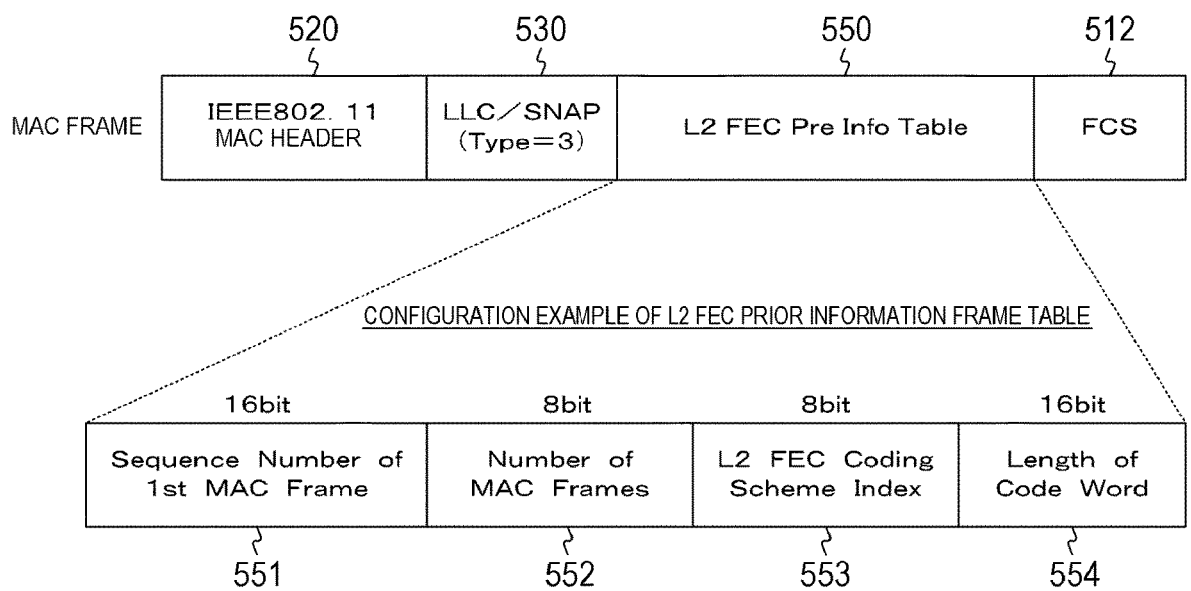
FIG. 7 is a view illustrating an example of a definition of a type field in LLC/SNAP of the IEEE 802.11 frame exchanged between the information processing apparatuses in the embodiment of the present technology.
FIG. 8 is a view illustrating a configuration example of an L2 FEC prior information frame exchanged between the information processing apparatuses in the embodiment of the present technology.

The L2 FEC prior information table generating/L2 FEC prior information frame generating unit 244 generates an L2 FEC prior information table (illustrated in lower part of FIG. 8) and generates an L2 FEC prior information frame (illustrated in upper part of FIG. 8).

The L1 frame (PPDU) generating unit 245 generates a PHY frame with respect to a frame generated by each unit. For example, the L1 frame (PPDU) generating unit 245 generates a PHY frame with respect to each of the MAC frame generated by the L2 data frame generating unit 241, the L2 redundancy signal frame generated by the L2 coding/L2 redundancy signal frame generating unit 243, and the L2 FEC prior information frame generated by the L2 FEC prior information table generating/L2 FEC prior information frame generating unit 244.

The L1 coding unit 246 performs error correction coding processing with respect to the PHY frame generated by the L1 frame (PPDU) generating unit 245. For example, low density parity check (LDPC) coding processing and convolution coding processing are performed as the error correction coding processing.

The interleaving unit 247 sorts data in such a manner that an error is spread.

The mapping unit 248 modulates each piece of data and combines some bits. For example, the mapping unit 248 performs mapping of a bit stream of a transmission signal on a complex plane.

The OFDM modulation unit (IFFT) 249 performs modulation by inverse Fourier transform (IFFT).

The guard interval insertion unit 250 performs insertion of a guard interval.

The DA conversion RF transmitter 251 generates an analog signal by performing DA conversion of a transmission signal, and transmits the analog signal from the antenna 252.

[Functional Configuration Example of Reception Unit]

Figure 5:
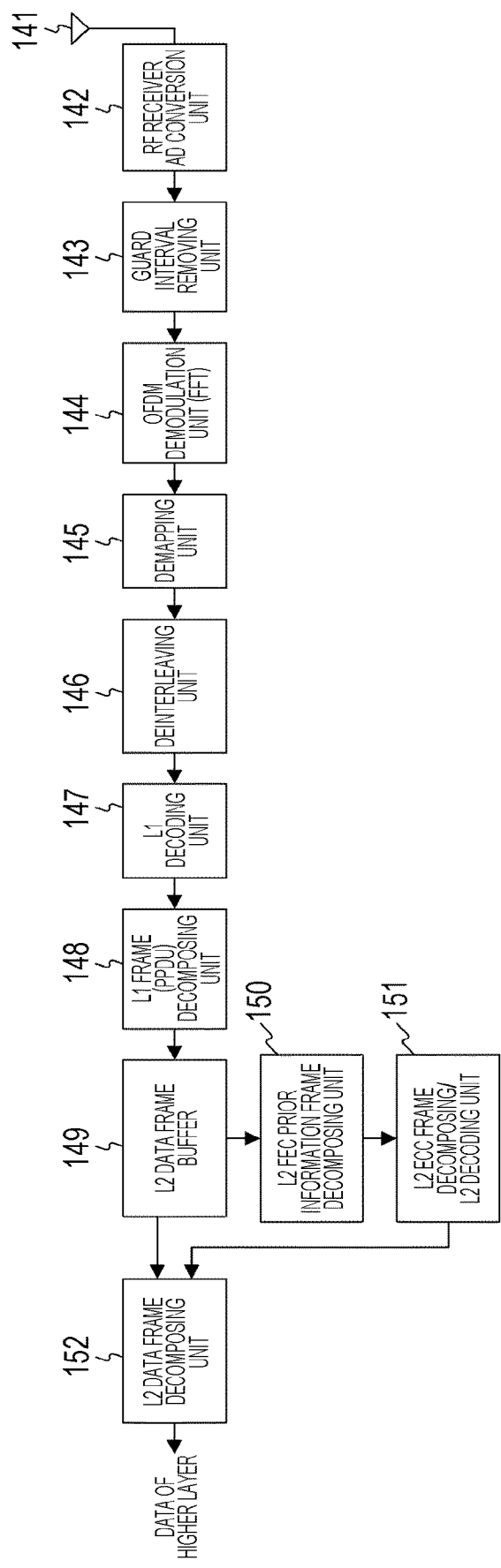
FIG. 5 is a block diagram illustrating a functional configuration example of a wireless communication unit 110 of the information processing apparatus (master station) 100 in the embodiment of the present technology.

FIG. 5 is a block diagram illustrating a functional configuration example of the wireless communication unit 110 of the information processing apparatus (master station) 100 in the embodiment of the present technology.

As a functional configuration to perform reception processing, the wireless communication unit 110 includes an antenna 141, an RF receiver analog to digital (AD) conversion unit 142, a guard interval removing unit 143, an OFDM demodulation unit (fast Fourier transform (FFT)) 144, a demapping unit 145, a deinterleaving unit 146, an L1 decoding unit 147, an L1 frame (PPDU) decomposing unit 148, an L2 data frame buffer 149, an L2 FEC prior information frame decomposing unit 150, an L2 error check and correct (ECC) frame decomposing/L2 decoding unit 151, and an L2 data frame decomposing unit 152. Then, the wireless communication unit 110 passes, to a higher layer, data on which these kinds of reception processing are performed (such as TCP/IP packet).

The antenna 141, the RF receiver AD conversion unit 142, the guard interval removing unit 143, the OFDM demodulation unit (FFT) 144, the demapping unit 145, the deinterleaving unit 146, the L1 decoding unit 147, the L1 frame (PPDU) decomposing unit 148, and the L2 data frame decomposing unit 152 respectively perform opposite processing of the antenna 252, the DA conversion RF transmitter 251, the guard interval insertion unit 250, the OFDM modulation unit (IFFT) 249, the mapping unit 248, the interleaving unit 247, the L1 coding unit 246, the L1 frame (PPDU) generating unit 245, and the L2 data frame generating unit 241 that are illustrated in FIG. 4.

Also, the L2 data frame buffer 149 corresponds to the L2 data frame buffer 242 illustrated in FIG. 4.

The L2 FEC prior information frame decomposing unit 150 decomposes an L2 FEC prior information frame among frames held in the L2 data frame buffer 149.

The L2 ECC frame decomposing/L2 decoding unit 151 decomposes an L2 redundancy signal frame and performs L2 decoding processing.

[Configuration Example of IEEE 802.11 Frame]

FIG. 6 is a view illustrating a configuration example of an IEEE 802.11 frame exchanged between information processing apparatuses in the embodiment of the present technology.

A configuration example of an IEEE 802.11 frame is illustrated in a of FIG. 6. More specifically, the IEEE 802.11 frame includes a physical header 500 and a PLCP service data unit (PSDU) (MAC frame) 510, Also, the physical header 500 includes a PLCP preamble 501 and a PLCP header 501

A configuration example of the PSDU (MAC frame) 510 illustrated in a of FIG. 6 is illustrated in h of FIG. 6. More specifically, the PSDU (MAC frame) 510 includes an IEEE 802.11 MAC header 520, logical link control (LLC)/subnetwork access protocol (SNAP) 530, data 511, and a frame check sequence (FCS) 512.

The IEEE 802.11 MAC header 520 includes frame control 521, duration/ID 522, an address 1 523, an address 2 524, an address 3 525, sequence control 526, and an address 4 527.

Also, as illustrated in b of FIG. 6, the LLC/SNAP 530 is information arranged between the IEEE 802.11 MAC header 520 and the data 511 and is information to distinguish mapping of an L3 and an L2. That is, the LLC/SNAP 530 is information that can be grasped in a data link layer (second layer).

A configuration example of the LLC/SNAP 530 illustrated in b of FIG. 6 is illustrated in c of FIG. 6.

The LLC/SNAP 530 includes a destination service access point (DSAP) 531, a source service access point (SSAP) 532, control 533, an organizationally unique identifier (OUI) 534, and a type 535.

A value of AA is stored in the DSAP 531.

A value of AA is stored in the SSAP 532.

A value of 03 is stored in the control 533.

000000 or 0000F8 is stored in the OUI 534. For example, 000000 is stored in a case of an IP.

The type 535 is information indicating a protocol type of a data division. The type 535 is the same with that of the Ethernet (registered trademark). 0800 is stored in a case of an IP. Also, a definition of the type 535 will be described in detail with reference to FIG. 7.

[Example of Definition of Type Field in LLC/SNAP]

FIG. 7 is a view illustrating an example of a definition of a type field in LLC/SNAP of the IEEE 802.11 frame exchanged between the information processing apparatuses in the embodiment of the present technology.

A relationship between a Protocol name 541, a Payload type 542, and a Subclause 543 is illustrated in FIG. 7. An example of newly defining "3" and "4" of the Payload type 542 is illustrated in FIG. 7.

"L2 FEC Pre-information" of the Protocol name 541 means a frame illustrated in FIG. 8 (L2 FEC prior information frame). "3" of the Payload type 542 corresponding to this is a value indicating the L2 FEC prior information frame illustrated in FIG. 8.

An "L2 FEC Redundancy Code" of the Protocol name 541 means an L2 FEC redundancy signal frame (MAC header 422 and redundancy signal 421) illustrated in d of FIG. 13. "4" of the Payload type 542 corresponding to this is a value indicating the L2 FEC redundancy signal frame illustrated in d of FIG. 13.

[Configuration Example of L2 FEC Prior Information Frame]

FIG. 8 is a view illustrating a configuration example of an L2 FEC prior information frame exchanged between the information processing apparatuses in the embodiment of the present technology.

The L2 FEC prior information frame illustrated in FIG. 8 corresponds to the PSDU (MAC frame) illustrated in b of FIG. 6. That is, an example of a case where a type of the LLC/SNAP 530 in the PSDU (MAC frame) illustrated in b of FIG. 6 is 3 ("3" of Payload type 542 illustrated in FIG. 7) is illustrated.

Also, an L2 FEC Pre Info Table 550 illustrated in FIG. 8 corresponds to the data 511 illustrated in b of FIG. 6. That is, the L2 FEC prior information frame table includes the L2 FEC Pre Info Table 550 illustrated in FIG. 8. Note that in a lower part of FIG. 8, a size of each field included in the L2 FEC prior information frame table is indicated with a numeric number (8 bit or 16 bit) on an upper side of each field.

The L2 FEC prior information frame table includes a Sequence Number of 1st MAC Frame 551, a Number of MAC Frames 552, an L2 FEC Coding Scheme Index 553, and a Length of Code Word 554.

In the Sequence Number of 1st MAC Frame 551, a sequence number (Seq No.) of a first MAC frame among MAC frames to be objects of error correction is stored.

In the Number of MAC Frames 552, the number of MAC frames to be objects of error correction (or bitmap) is stored.

The L2 FEC Coding Scheme Index 553 is an index indicating a coding method and a coding rate of an error correcting code. This index will be described in detail with reference to FIG. 9.

The Length of Code Word 554 is a word length (byte) of a code word.

[Example of Definition of L2 FEC Coding Scheme Index]

FIG. 9 is a view illustrating an example of a definition of an L2 FEC Coding Scheme Index in the L2 FEC prior information frame exchanged between the information processing apparatuses in the embodiment of the present technology.

In FIG. 9, a relationship between an L2 FEC coding scheme (CS) Index 561, a Coding Method 562, and a Coding Rate 563 is illustrated.

The L2 FEC CS Index 561 is a value to specify a coding method and a coding rate of an error correcting code.

The Coding Method 562 is a coding method of an error correcting code. Here, in FIG. 9, an example of using Reed-Solomon, or Bose Chaudhuri Hocquenghem (BCH) as a coding method of an error correcting code is illustrated. However, a different coding method may be used as a coding method of an error correcting code. For example, XOR or Raptor can be used.

The Coding Rate 563 is a coding rate of an error correcting code.

[Example of Frame of Transmitting L2 FEC Prior Information and Redundancy Signal]

FIG. 10 is a view illustrating a kind of a frame exchanged between the information processing apparatuses in the embodiment of the present technology.

In FIG. 10, an example of a relationship between a Type value 571, a Type description 572, a Subtype value 573, and a Subtype description 574 is illustrated.

As indicated by a rectangular thick line 575, in a case of being transmitted in an Action Frame, L2 FEC prior information and a redundancy signal are transmitted as "QoS management frame (QMF) service" (see IEEE 802.11ae specification). Also, a format example of a case where L2 FEC prior information and a redundancy signal are transmitted in an Action Frame is illustrated in FIG. 11 and FIG. 12.

Here, usually, a management frame is transmitted in AC_VO. However, in a case of being transmitted in an Action Frame, L2 FEC prior information and a redundancy signal are transmitted in an enhanced distributed channel access (EDCA) access category that is the same with that of a data frame.

Also, as indicated by a rectangular thick line 576, in a case of being transmitted in a Data Frame, L2 FEC prior information and a redundancy signal are transmitted as "QoS Data." Here, in a case of being transmitted in a Data Frame, L2 FEC prior information and a redundancy signal are transmitted in an EDCA access category that is the same with that of a data frame.

[Example of Format in Case of Transmitting L2 FEC Prior Information and Redundancy Signal in Action Frame]

FIG. 11 and FIG. 12 are views illustrating examples of a format of an Action Frame exchanged between the information processing apparatuses in the embodiment of the present technology.

A format example of a case where L2 FEC prior information is transmitted in an Action Frame is illustrated in a of FIG. 11. Pieces of information in Order "3" to "6" respectively correspond to pieces of information with the same names in the lower part of FIG. 8 (Sequence Number of 1st MAC Frame 551, Number of MAC Frames 552, L2 FEC Coding Scheme Index 553, and Length of Code Word 554).

A format example in a case where a redundancy signal is transmitted in an Action Frame is illustrated in b of FIG. 11. A Redundancy Code in Order "3" indicates a redundancy signal.

A kind of an Action field is illustrated in a of FIG. 12.

Category Values are illustrated in b of FIG. 12. A new value "X" is defined in the embodiment of the present technology.

L2 FEC Action field values are illustrated in c of FIG. 12. That is, in a case where a value is "0," the L2 FEC prior information frame (Action Frame) illustrated in a of FIG. 11 is indicated. Also, in a case where values are "1," the redundancy signal frame (Action Frame) illustrated in b of FIG. 11 is indicated.

[Example of Generation of L2 FEC Prior Information Frame and Redundancy Signal Frame]

FIG. 13 is a view schematically illustrating generation processing of an L2 FEC prior information frame and generation processing of a redundancy signal frame by the information processing apparatus (slave station) 200 in the embodiment of the present technology.

In FIG. 13, an example of a case where a coding rate is ¾ is illustrated. That is, an example of a case where one symbol of a redundancy signal is added to three symbols of information data is illustrated in FIG. 13. Also, an example of processing one L2 (MAC) frame as one symbol is illustrated in FIG. 13. That is, an example of generating one redundancy signal frame with respect to three MAC frames is illustrated in FIG. 13.

As illustrated in a of FIG. 13, the L2 data frame generating unit 241 encapsulates data, which is received from a higher layer that is an L3 or higher, as MAC frames 1 (401) to 3 (403) by adding an LLC header, a MAC header, and an FCS thereto according to a conventional method. Note that an access category will be described in detail with reference to FIG. 14.

Also, in a case where the generated MAC frames 1 (401) to 3 (403) are objects of L2 FEC addition, the L2 data frame generating unit 241 stores the MAC frames into the L2 data frame buffer 242. Here, in a case where there is a correspondence with an access category and a destination (transmission destination) instructed by the control unit 130, it can be determined that the generated MAC frames are objects of the L2 FEC addition.

For example, a case where the control unit 130 outputs an instruction that a MAC frame an access category of which is AC_VO (Voice) or AC_VI (Video) and a destination of which is a device A is an object of the L2 FEC addition is assumed. In this case, it is determined that a MAC frame an access category of which is AC_VO (Voice) or AC_VI (Video) and a destination of which is the device A is an object of the L2 FEC addition. On the other hand, it is determined that a MAC frame an access category of which is AC_BE (Best Effort) or AC_BK (Back Ground) is not an object of the L2 FEC addition regardless of a destination. Also, it is determined that a MAC frame an access category of which is AC_VO or AC_VI but a destination of which is a device other than the device A is not an object of the L2 FEC addition.

Also, in a case where a MAC frame is not an object of the L2 FEC addition, the L2 data frame generating unit 241 passes the generated MAC frame as it is to the L1 frame (PPDU) generating unit 245.

In a case where three MAC frames are accumulated in the L2 data frame buffer 242, the L2 coding/L2 redundancy signal frame generating unit 243 extracts the three MAC frames from the L2 data frame buffer 242, as illustrated in b of FIG. 13. Then, the L2 coding/L2 redundancy signal frame generating unit 243 performs padding according to a length (fixed length) of each symbol of the three MAC frames. That is, the L2 coding/L2 redundancy signal frame generating unit 243 performs padding with respect to the MAC frames 1 (401) to 3 (403) in such a manner that the MAC frames 1 (401) to 3 (403) become a predetermined symbol length. Padding regions of the MAC frames 1 (401) to 3 (403) illustrated in b of FIG. 13 are indicated by padding 411 to 413.

Then, as illustrated in c of FIG. 13, the L2 coding/L2 redundancy signal frame generating unit 243 generates a redundancy signal (check code) 421 according to a coding method instructed by the control unit 130 on the basis of the three MAC frames on which padding is performed.

Also, as illustrated in c of FIG. 13, the L2 FEC prior information table generating/L2 FEC prior information frame generating unit 244 generates an L2 FEC prior information table (L2 FEC prior information 431). For example, the L2 FEC prior information table generating/L2 FEC prior information frame generating unit 244 generates an L2 FEC prior information table including pieces of information illustrated in the lower part of FIG. 8. In this case, the L2 FEC prior information table generating/L2 FEC prior information frame generating unit 244 can designate a coding method and a coding rate of the L2 FEC prior information by using an index number (L2 FEC CS Index 561 illustrated in FIG. 9).

Then, as illustrated in d of FIG. 13, the L2 coding/L2 redundancy signal frame generating unit 243 generates a MAC frame by adding a MAC header 422, LLC/SNAP, and an FCS to the generated redundancy signal 421. Note that LLC/SNAP and an FCS are omitted in d of FIG. 13. Also, in generation of a MAC frame, the L2 coding/L2 redundancy signal frame generating unit 243 sets a value indicating an L2 FEC redundancy signal ("4" in Payload type 542 illustrated in FIG. 7) in a type field of LLC/SNAP (type 535 illustrated in c of FIG. 6).

In such a manner, the L2 coding/L2 redundancy signal frame generating unit 243 generates an L2 redundancy signal frame.

Also, as illustrated in d of FIG. 13, the L2 FEC prior information table generating/L2 FEC prior information frame generating unit 244 generates a MAC frame by adding a MAC header 432, LLC/SNAP, and an FCS to the generated L2 FEC prior information 431. Note that LLC/SNAP and an FCS are omitted in d of FIG. 13. Also, in generation of a MAC frame, the L2 FEC prior information table generating/L2 FEC prior information frame generating unit 244 sets a value indicating L2 FEC prior information ("3" in Payload type 542 illustrated in FIG. 7) in a type field of LLC/SNAP (type 535 illustrated in c of FIG. 6).

In such a manner, the L2 FEC prior information table generating/L2 FEC prior information frame generating unit 244 generates an L2 FEC prior information frame. A configuration example of the L2 FEC prior information frame generated in such a manner is illustrated in FIG. 8.

Figure 14:
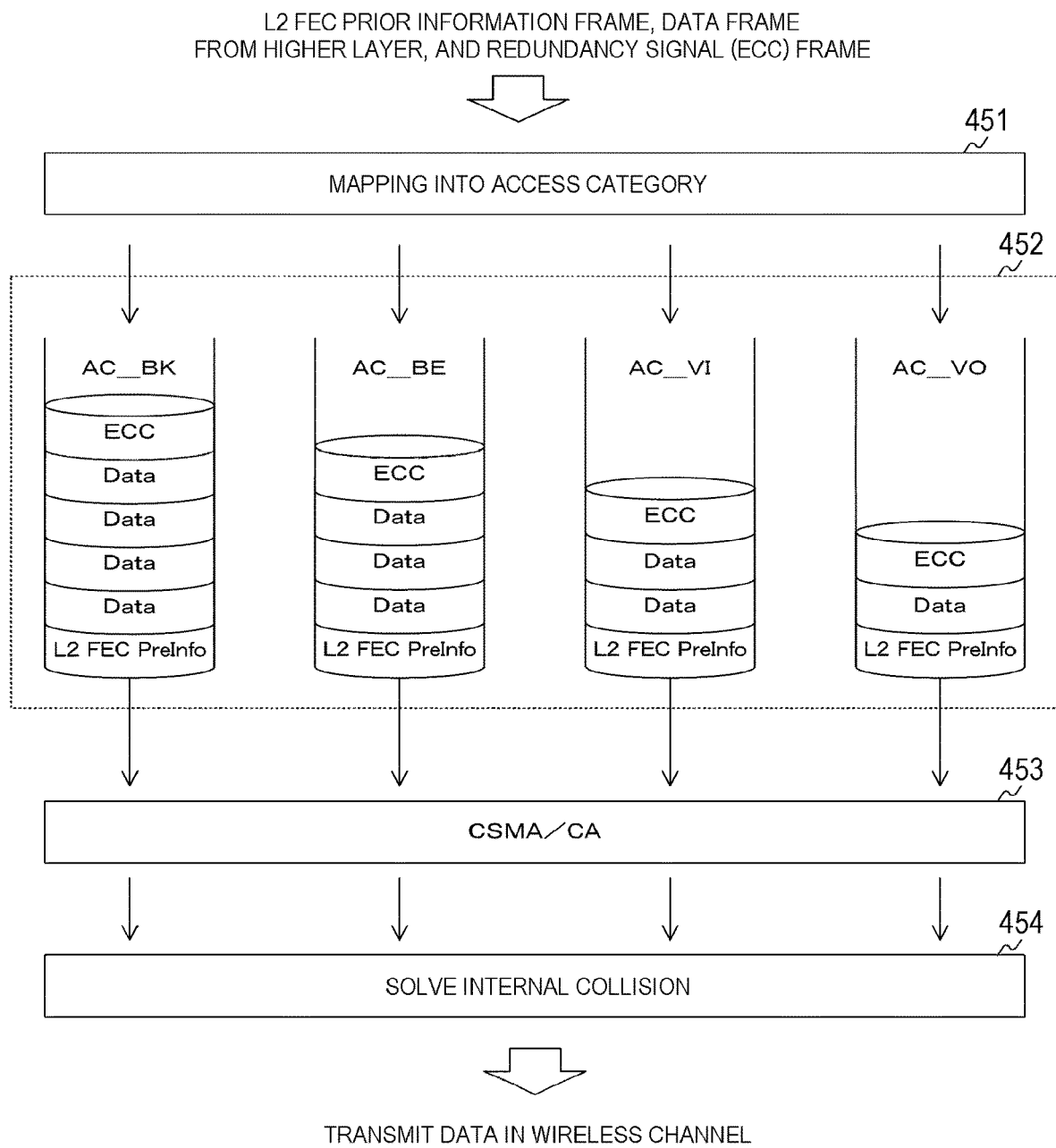
FIG. 14 is a view schematically illustrating an example of a queuing method of each frame transmitted from the information processing apparatus (slave station) 200 in the embodiment of the present technology.

The frames generated in such a manner are serially stored in a queue. More specifically, storing into a queue is performed serially from the L2 FEC prior information frame (MAC header 432 and L2 FEC prior information 431) illustrated in d of FIG. 13. This example is illustrated in FIG. 14.

Also, the information processing apparatus (slave station) 200 that transmits an L2 FEC prior information frame, a data frame, and a redundancy signal frame subsequently transmits a block ACK request.

In such a manner, the control unit 230 of the information processing apparatus (slave station) 200 performs control of performing transmission while adding a frame, which includes a redundancy signal to perform error correction in a data link layer, to a data frame in which a frame including data is coded in a unit of a MAC frame. Also, the control unit 230 of the information processing apparatus (slave station) 200 performs control of performing transmission while including a redundancy signal into a frame designating a value, which indicates that the redundancy signal is included, in LLC/SNAP.

Also, the control unit 230 of the information processing apparatus (slave station) 200 performs control of adding, in front of a frame to transmit data, accompanying information (L2 FEC prior information 431) that is information used in performance of error correction in a data link layer and that includes a coding method of a redundancy signal to perform the error correction in the data link layer, a coding rate of the redundancy signal, and object frame information to specify an object frame to be an object of the error correction in the data link layer, and of performing transmission thereof.

[Example of Transmission of ACK by Information Processing Apparatus Receiving L2 FEC Prior Information]

Here, an example of a case where the information processing apparatus (slave station) 200 transmits an L2 FEC prior information frame, a data frame, and a redundancy signal frame to the information processing apparatus (master station) 100 is described.

The information processing apparatus (master station) 100 that receives L2 FEC prior information can grasp that the received information is the L2 FEC prior information on the basis of a type field of LLC/SNAP. Also, on the basis of the L2 FEC prior information, the information processing apparatus (master station) 100 can specify a sequence number of a data frame received in and after reception of the L2 FEC prior information. For example, it is possible to specify a sequence number of a data frame on the basis of the Sequence Number of 1st MAC Frame 551 and the Number of MAC Frames 552 illustrated in FIG. 8. Subsequently, the information processing apparatus (master station) 100 waits for an arrival of a data frame corresponding to a sequence number specified by the L2 FEC prior information.

Then, the information processing apparatus (master station) 100 determines to pass data to a higher layer in a case where each data frame is received correctly. In this case, the information processing apparatus (master station) 100 can immediately transmit an ACK back. Alternatively, in a case where each data frame is received correctly, the information processing apparatus (master station) 100 may transmit an ACK back with receiving a block ACK request being a condition.

Also, in a case where a data frame cannot be received correctly, the information processing apparatus (master station) 100 tries to recover data by using a received redundancy signal. Then, in a case where the data is recovered with the redundancy signal, the information processing apparatus (master station) 100 determines to pass the data to a higher layer. In this case, the information processing apparatus (master station) 100 can transmit an ACK back with reception of a block ACK request being a condition.

Note that in a case where each data frame is received correctly, even in a case where reception of a redundancy signal frame following this fails, the information processing apparatus (master station) 100 may determine to pass data to a higher layer and may transmit an ACK back.

In such a manner, in a case where it is determined to pass data to a higher layer on the basis of determination information (redundancy signal), the control unit 130 of the information processing apparatus (master station) 100 performs control of transmitting, to a device of a transmission source of the data, an acknowledgement (ACK) to give notification that the data is received correctly.

Also, in a case where loss correction of data is performed on the basis of determination information (redundancy signal), the control unit 130 of the information processing apparatus (master station) 100 performs control of transmitting, to a device of a transmission source of the data, an acknowledgement (ACK) to give notification that the data is received correctly.

Note that an example in which an L2 FEC prior information frame and a redundancy signal frame are different frames is illustrated in FIG. 13. However, L2 FEC prior information may be included in a redundancy signal frame. This example is illustrated in FIG. 19.

[Example of Queuing of Each Frame]

FIG. 14 is a view schematically illustrating an example of a queuing method of each frame transmitted from the information processing apparatus (slave station) 200 in the embodiment of the present technology.

In FIG. 14, an example of a case where a packet is transmitted by an enhanced distributed channel access (EDCA) system is illustrated.

More specifically, in the EDCA, a packet to be transmitted is classified into four access categories (AC) and stored into each transmission queue (451 and 452). Subsequently, each packet is transmitted according to priority of each packet. Here, four ACs are AC_voice (VO), AC_video (VI), AC_best effort (BE), and AC_back ground (BK). Also, in FIG. 14, the ACs are illustrated in the order of priority. Then, transmission from a transmission queue is performed in the order from traffic with high priority (453 and 454).

As illustrated in FIG. 14, mapping into an access category is performed with respect to each of an L2 FEC prior information frame, a data frame from a higher layer, and a redundancy signal (ECC) frame (packet) (451). Subsequently, each packet is classified into the four access categories (AC) and stored into each transmission queue (452). Note that the number of pieces of Data stored in each transmission queue varies depending on a number N of a coding rate.

Subsequently, carrier sense multiple access with collision avoidance (CSMA/CA) is performed (453) and internal collision is solved (454). Then, data is transmitted in a wireless channel.

In such a manner, a data frame, an accompanying L2 FEC prior information frame, and a redundancy signal frame are put into a queue of the same access category. With this arrangement, it is possible to prevent the order of transmission of the L2 FEC prior information frame, the data frame, and the redundancy signal frame from being changed.

In such a manner, the control unit 130 of the information processing apparatus (master station) 100 performs control of performing transmission while putting determination information (redundancy signal) and accompanying information (L2 FEC prior information) into a queue of an access category that is the same with that of an object frame. In this case, the control unit 130 performs control of performing transmission in the order of a frame including the accompanying information (L2 FEC prior information frame), the object frame (data frame), and a frame including the determination information (redundancy signal frame).

[Configuration Example of Aggregation Frame]

FIG. 15 is a view illustrating a configuration example of an aggregation frame exchanged between the information processing apparatuses in the embodiment of the present technology.

Here, aggregation is a technology of bundling a plurality of frames and performing transmission thereof as one frame. Also, an aggregation frame means a frame in which a plurality of frames is bundled and which is transmitted as one frame. In other words, a frame in which a plurality of frames is coupled and which is transmitted as one frame is meant. For example, there are an aggregation MAC protocol data unit (A-MPDU) and an aggregation MAC service data unit (A-MSDU) as aggregation frames.

In FIG. 15, a description is made with the A-MPDU as an example of an aggregation frame.

In b of FIG. 15, a configuration example of frame aggregation (A-MPDU) is illustrated.

As illustrated in b of FIG. 15, in IEEE 802.11, it is possible to couple and transmit a plurality of MAC frames by using a mechanism called the A-MPDU. Also, in a case where an error is generated, it is possible to retransmit only a frame with the error by using a mechanism called a block ACK.

More specifically, the A-MPDU includes a PLCP preamble 621, a PLCP header 622, and delimiters 623 to 627, and MAC frames 628 to 632.

In a of FIG. 15, a configuration example of a case where frame aggregation (A-MPDU) is applied to an L2 FEC (case of coding rate: M/N) is illustrated.

As illustrated in a of FIG. 15, it is possible to couple and transmit an L2 FEC prior information frame, a data frame, and a redundancy signal frame by using the A-MPDU. Also, an object of a block ACK request may be all frames or may be only a data frame. In either case, an ACK may be transmitted back in a case where a data frame is recovered.

More specifically, the A-MPDU includes a PLCP preamble 601, a PLCP header 602, delimiters 603 to 607, L2 FEC prior information (MAC frame) 608, MAC frames 609 to 611, and a redundancy signal (MAC frame) 612.

That is, the L2 FEC prior information (MAC frame) 608 is arranged immediately after the delimiter 603, and the redundancy signal (MAC frame) 612 is arranged immediately after the delimiter 607.

[Operation Example of Information Processing Apparatus]

Figure 16:
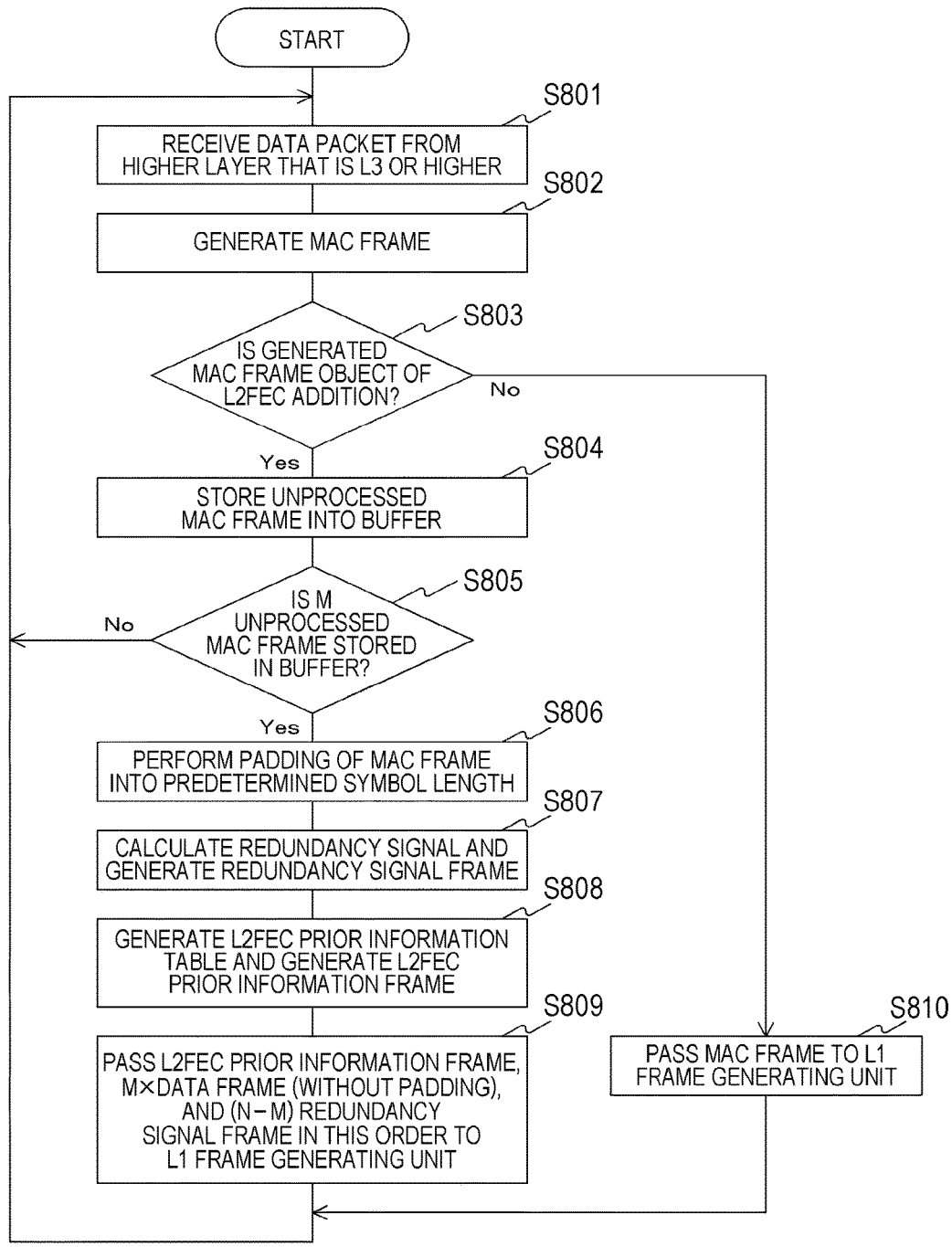
FIG. 16 is a flowchart illustrating an example of a processing procedure of the generation processing of L2 FEC prior information and a redundancy signal frame by the information processing apparatus (slave station) 200 in the embodiment of the present technology.
Figure 17:
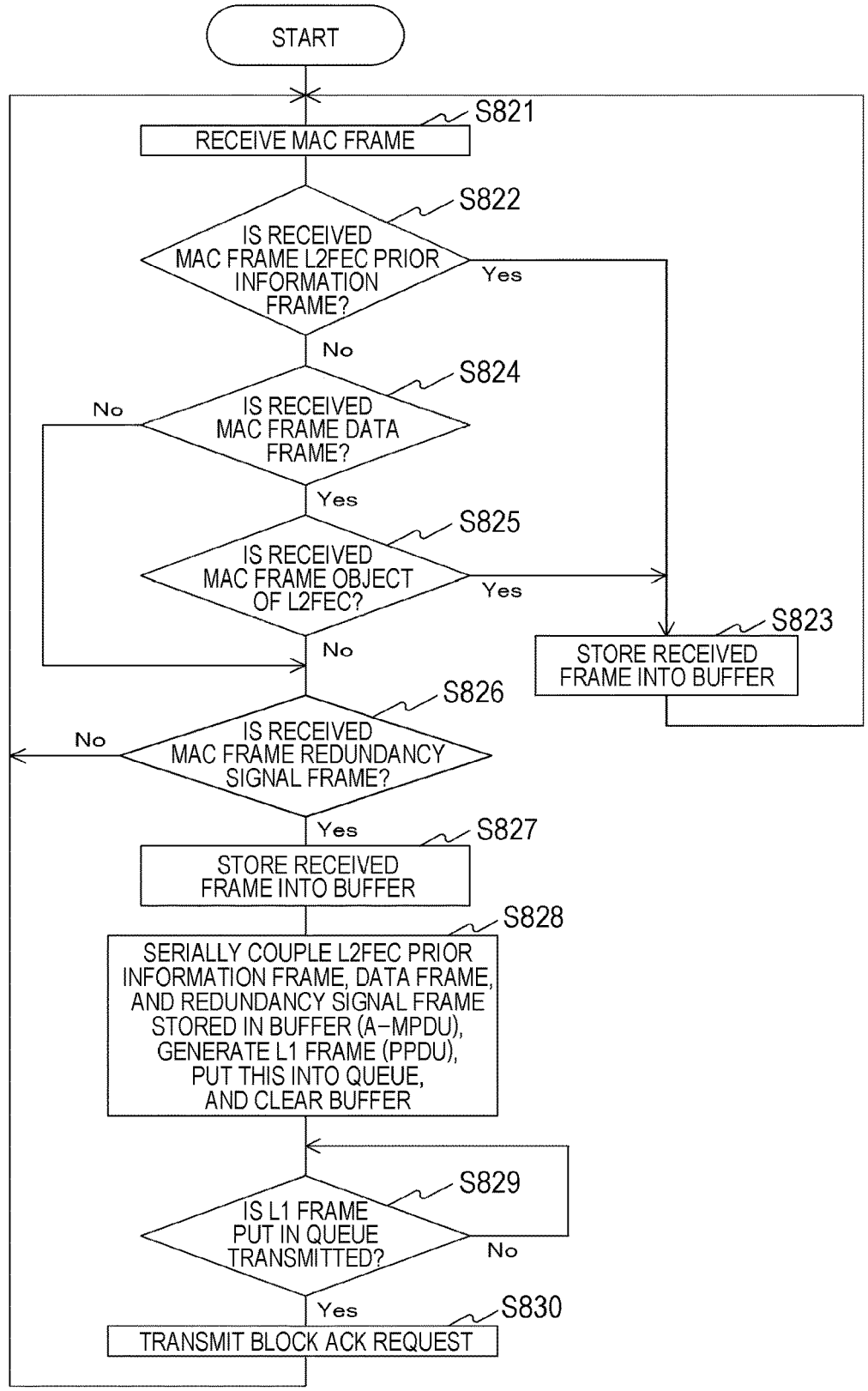
FIG. 17 is a flowchart illustrating an example of a processing procedure of frame transmission processing and block ACK request processing by the information processing apparatus (slave station) 200 in the embodiment of the present technology.

Next, an operation example of each information processing apparatus will be described. In FIG. 16 and FIG. 17, operation examples of a case where an information processing apparatus on a transmission side is the information processing apparatus (slave station) 200 are illustrated. Also, in FIG. 18, an operation example of a case where an information processing apparatus on a reception side is the information processing apparatus (master station) 100 is illustrated.

[Operation Example on Transmission Side (Example of Generating L2 FEC Prior Information Frame and Redundancy Signal Frame)]

FIG. 16 is a flowchart illustrating an example of a processing procedure of generation processing of L2 FEC prior information and a redundancy signal frame by the information processing apparatus (slave station) 200 in the embodiment of the present technology. In FIG. 16, each kind of processing until a generated MAC frame is delivered to the L1 frame (PPDU) generating unit 245 is described. Each of these kinds of processing is performed on the basis of control by the control unit 230. Also, in FIG. 16, an example of a case where a coding rate is M/N is illustrated.

First, the L2 data frame generating unit 241 receives data (data packet) to be transmitted from a higher layer that is an L3 or higher (step S801). Subsequently, the L2 data frame generating unit 241 generates a MAC frame (L2 frame) with respect to the received data (step S802).

Subsequently, the control unit 130 determines whether the generated MAC frame is an object of L2 FEC addition (step S803). In a case where the generated MAC frame is not an object of the L2 FEC addition (step S803), the L2 data frame generating unit 241 passes the generated MAC frame to the L1 frame (PPDU) generating unit 245 (step S810).

Also, in a case where the generated MAC frame is an object of the L2 FEC addition (step S803), the L2 data frame generating unit 241 makes the L2 data frame buffer 242 hold the generated MAC frame (step S804).

Subsequently, the control unit 130 determines whether M unprocessed MAC frames are stored in the L2 data frame buffer 242 (step S805). In a case where M unprocessed MAC frames are not stored in the L2 data frame buffer 242 (step S805), the processing goes back to step S801.

In a case where M unprocessed MAC frames are stored in the L2 data frame buffer 242 (step S805), the L2 coding/L2 redundancy signal frame generating unit 243 performs padding with respect to the M MAC frames (step S806). That is, the L2 coding/L2 redundancy signal frame generating unit 243 performs padding of each MAC frame into a predetermined symbol length (step S806).

Subsequently, the L2 coding/L2 redundancy signal frame generating unit 243 calculates a redundancy signal with respect to the MAC frame on which padding is performed, and generates a redundancy signal frame (MAC frame) by using this redundancy signal (step S807).

Subsequently, L2 FEC prior information table generating/L2 FEC prior information frame generating unit 244 generates an L2 FEC prior information table, and generates an L2 FEC prior information frame (step S808).

Subsequently, the generated L2 FEC prior information frame, M data frames (without padding), and (N-M) redundancy signal frames are serially delivered to the L1 frame (PPDU) generating unit 245 (step S809).

[Example of Frame Transmission Processing and Block ACK Request Processing]

FIG. 17 is a flowchart illustrating an example of a processing procedure of frame transmission processing and block ACK request processing by the information processing apparatus (slave station) 200 in the embodiment of the present technology. In FIG. 17, an example of frame transmission processing using an A-MPDU is illustrated. Also, each of these kinds of processing is performed on the basis of control by the control unit 230.

First, the L1 frame (PPDU) generating unit 245 receives a MAC frame held in the L2 data frame buffer 242 (step S821). Subsequently, the L1 frame (PPDU) generating unit 245 determines whether the MAC frame is an L2 FEC prior information frame (step S822).

In a case where the MAC frame is an L2 FEC prior information frame (step S822), the MAC frame becomes a frame at a head of the A-MPDU. Thus, the L1 frame (PPDU) generating unit 245 makes a buffer hold the MAC frame (step S823). Then, the processing goes back to step S821.

In a case where the MAC frame is not an L2 FEC prior information frame (step S822), the L1 frame (PPDU) generating unit 245 determines whether the MAC frame is a data frame (step S824). Then, in a case where the MAC frame is not a data frame (step S824), the processing goes to step S826.

In a case where the MAC frame is a data frame (step S824), the L1 frame (PPDU) generating unit 245 determines whether the MAC frame is an object of an L2 FEC (step S825). In a case where the MAC frame is an object of the L2 FEC (step S825), the L1 frame (PPDU) generating unit 245 makes the buffer hold the MAC frame (step S823).

In a case where the MAC frame is not a data frame (step S824) or not an object of the L2 FEC (step S825), the L1 frame (PPDU) generating unit 245 determines whether the MAC frame is a redundancy signal frame (step S826). In a case where the MAC frame is not a redundancy signal frame (step S826), the processing goes back to step S821.

In a case where the MAC frame is a redundancy signal frame (step S826), the MAC frame is the last frame of the A-MPDU. Thus, the L1 frame (PPDU) generating unit 245 makes the buffer hold the MAC frame (step S827).

Subsequently, the L1 frame (PPDU) generating unit 245 serially couples, as the A-MPDU, the L2 FEC prior information frame, data frame, and redundancy signal frame stored in the buffer and generates an L1 frame (PPDU) (step S828). Then, the L1 frame (PPDU) generating unit 245 puts the L1 frame (PPDU) into a queue, and clears the buffer (step S828).

Subsequently, the control unit 230 determines whether the L1 frame (PPDU) put in the queue is transmitted (step S829). Then, in a case where the L1 frame (PPDU) put in the queue is not transmitted (step S829), monitoring is kept performed. Also, in a case where the L1 frame (PPDU) put in the queue is transmitted (step S829), the control unit 230 performs control to transmit a block ACK request (step S830). Note that step S801 to S809 illustrated in FIG. 16, and step S821 to S829 illustrated in FIG. 17 are an example of a control procedure of performing transmission described in a claim.

[Operation Example on Reception Side]

Figure 18:
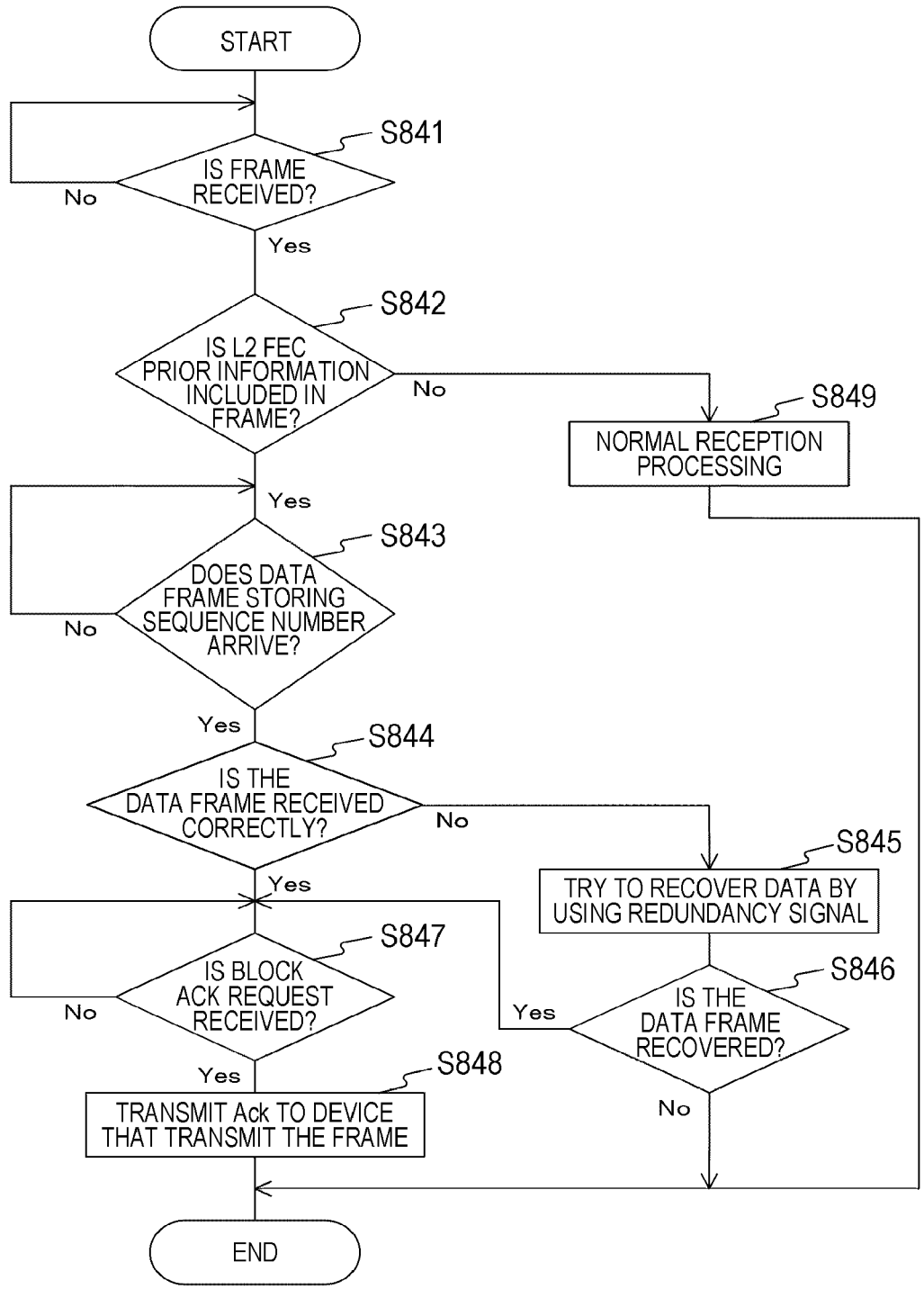
FIG. 18 is a flowchart illustrating an example of a processing procedure of reception processing by the information processing apparatus (master station) 100 in the embodiment of the present technology.

FIG. 18 is a flowchart illustrating an example of a processing procedure of reception processing by the information processing apparatus (master station) 100 in the embodiment of the present technology. Each of these kinds of processing is performed on the basis of control by the control unit 130.

First, the control unit 130 determines whether a frame is received (step S841). In a case where a frame is not received (step S841), monitoring is kept performed.

In a case where a frame is received (step S841), reception processing is performed with respect to each frame, and each frame on which the reception processing is performed is held in the L2 data frame buffer 149. Then, the control unit 130 determines whether L2 FEC prior information is included in the received frame (step S842). In a case where L2 FEC prior information is not included in the received frame (step S842), normal reception processing is performed (step S849). Here, a detailed description of the normal reception processing is omitted.

In a case where L2 FEC prior information is included in the received frame (step S842), the control unit 130 waits for an arrival of a data frame corresponding to a sequence number specified by the L2 FEC prior information (step S843).

Subsequently, the control unit 130 determines whether each data frame corresponding to the sequence number specified by the L2 FEC prior information is received correctly (step S844). In a case where each data frame is received correctly (step S844), the control unit 130 determines that data of each data frame is passed to a higher layer of a data link layer. Then, the control unit 130 determines whether a block ACK request is received (step S847). In a case where a block ACK request is not received (step S847), monitoring is kept performed.

In a case where a block ACK request is received (step S847), the control unit 130 transmits an ACK to an information processing apparatus that transmits a frame received correctly (step S848).

Also, in a case where each data frame is not received correctly (step S844), the control unit 130 tries to recover data by using a received redundancy signal (step S845). Then, the control unit 130 determines whether the data is recovered with the redundancy signal (step S846).

In a case where the data is recovered with the redundancy signal (step S846), the control unit 130 determines to pass the recovered data to a higher layer of the data link layer, and goes to step S847. In a case where the data is not recovered with the redundancy signal (step S846), the control unit 130 determines not to pass the data to a higher layer of the data link layer. In this case, an ACK is not transmitted and an operation of the reception processing is ended. Note that step S841 to S846 are an example of a control procedure of determining described in a claim.

[Example of Storing L2 FEC Prior Information and Redundancy Signal into One Frame]

In the above, an example in which an L2 FEC prior information frame and a redundancy signal frame are different frames has been described. However, L2 FEC prior information may be included in a redundancy signal frame. Thus, in FIG. 19, an example of storing L2 FEC prior information and a redundancy signal into one frame is illustrated.

FIG. 19 is a view illustrating a configuration example of a frame exchanged between the information processing apparatuses in the embodiment of the present technology.

The frame illustrated in FIG. 19 corresponds to the PSDU (MAC frame) illustrated in b of FIG. 6. That is, an example of a case where a type of LLC/SNAP 530 in the PSDU (MAC frame) illustrated in b of FIG. 6 is a newly-defined value is illustrated. The newly-defined value is a value indicating that L2 FEC prior information and a redundancy signal are included in one frame.

Also, an L2 FEC Pre Info Table 583, a Redundancy Code ID 584, and a Redundancy Code 585 illustrated in FIG. 19 correspond to the data 511 illustrated in b of FIG. 6. That is, the L2 FEC prior information frame table (illustrated in lower part of FIG. 8) includes the L2 FEC Pre Info Table 583. Also, a redundancy signal includes the Redundancy Code 585.

The Redundancy Code ID 584 is an ID transmitted, in a case where all object data frames are recovered, instead of an ACK to a transmission source of the data frames. With transmission of the Redundancy Code ID 584, it is possible to omit a sequence of a block ACK request and block ACK transmission.

Here, the frame illustrated in FIG. 19 can be added to a head or the last of a MAC frame. However, the frame illustrated in FIG. 19 is preferably added to the head of the MAC frame in such a manner that an information processing apparatus on a reception side can acquire L2 FEC prior information first.

As described above, it is possible to omit addition of an L2 FEC prior information frame by storing L2 FEC prior information and a redundancy signal into one frame.

In such a manner, for example, in an embodiment of the present technology, it is possible to notify a device on a reception side, by using an identifier of LLC/SNAP, that following data is not normal data but is a redundancy signal of forward error correction while keeping backward compatibility. With this arrangement, it becomes possible to perform error correction in an L2 without passing a redundancy signal to an L3 or higher and to avoid retransmission in the L2.

In such a manner, according to an embodiment of the present technology, it becomes possible to perform error correction in an L2 and to avoid unnecessary L2 retransmission in a wireless LAN system. With this arrangement, it is possible to prevent an increase in an overhead of signal processing. Also, since an IEEE 802.11 frame can be used, it is possible to secure compatibility.

Also, according to an embodiment of the present technology, an L2 FEC can be used as information used in a case where error correction is performed in an L2. Also, a coding method, a format, and the like of an L2 FEC to perform error correction in an L2 can be appropriately set.

In such a manner, according to an embodiment of the present technology, an L2 FEC redundancy signal transmission method in a wireless LAN system can be realized.

Note that an embodiment of the present technology can be also applied to a case of multicast transmission. Also, for example, an embodiment of the present technology can be applied to a case where data is transmitted by multicast and a redundancy signal is transmitted by unicast.

Also, the information processing apparatus (master station) 100, and the information processing apparatuses (slave station) 200 and 201 in the embodiment of the present technology can be applied to devices used in various fields. For example, application to a wireless device used in an automobile (such as car navigation apparatus or smartphone) is possible. Also, for example, application to vehicle-to-vehicle communication or road-to-vehicle communication (vehicle to X (V2X)) is possible. Also, for example, application to a learning device used in an educational field (such as tablet terminal) is possible. Also, for example, application to a wireless device used in an agricultural field (such as terminal of vegetable cultivation management system or terminal of cow management system) is possible. Similarly, for example, application to various wireless devices used in a sport field, a medical field, and the like is possible.

2. Application Example

A technology related to the present disclosure can be applied to various products. For example, each of an information processing apparatus (master station) 100, and information processing apparatuses (slave station) 200 and 201 may be realized as a mobile terminal such as a smartphone, a tablet personal computer (PC), a laptop, a portable game terminal, or a digital camera, a fixed terminal such as a television receiver, a printer, a digital scanner, or a network storage, or an in-vehicle terminal such as a car navigation apparatus. Also, each of the information processing apparatus (master station) 100, and the information processing apparatuses (slave station) 200 and 201 may be realized as a terminal to perform machine to machine (M2M) communication (also called machine type communication (MTC) terminal) which terminal is, for example, a smart meter, a vending machine, a remote monitoring apparatus, or a point of sale (POS) terminal. Moreover, each of the information processing apparatus (master station) 100, and the information processing apparatuses (slave station) 200 and 201 may be a wireless communication module mounted in such a terminal (such as integrated circuit module including one die).

On the other hand, for example, the information processing apparatus (master station) 100 may be realized as a wireless LAN access point (also called wireless base station) that has a router function or does not have a router function. Also, the information processing apparatus (master station) 100 may be realized as a mobile wireless LAN router. Moreover, the information processing apparatus (master station) 100 may be a wireless communication module mounted in such a device (such as integrated circuit module including one die).

2-1. First Application Example

Figure 20:
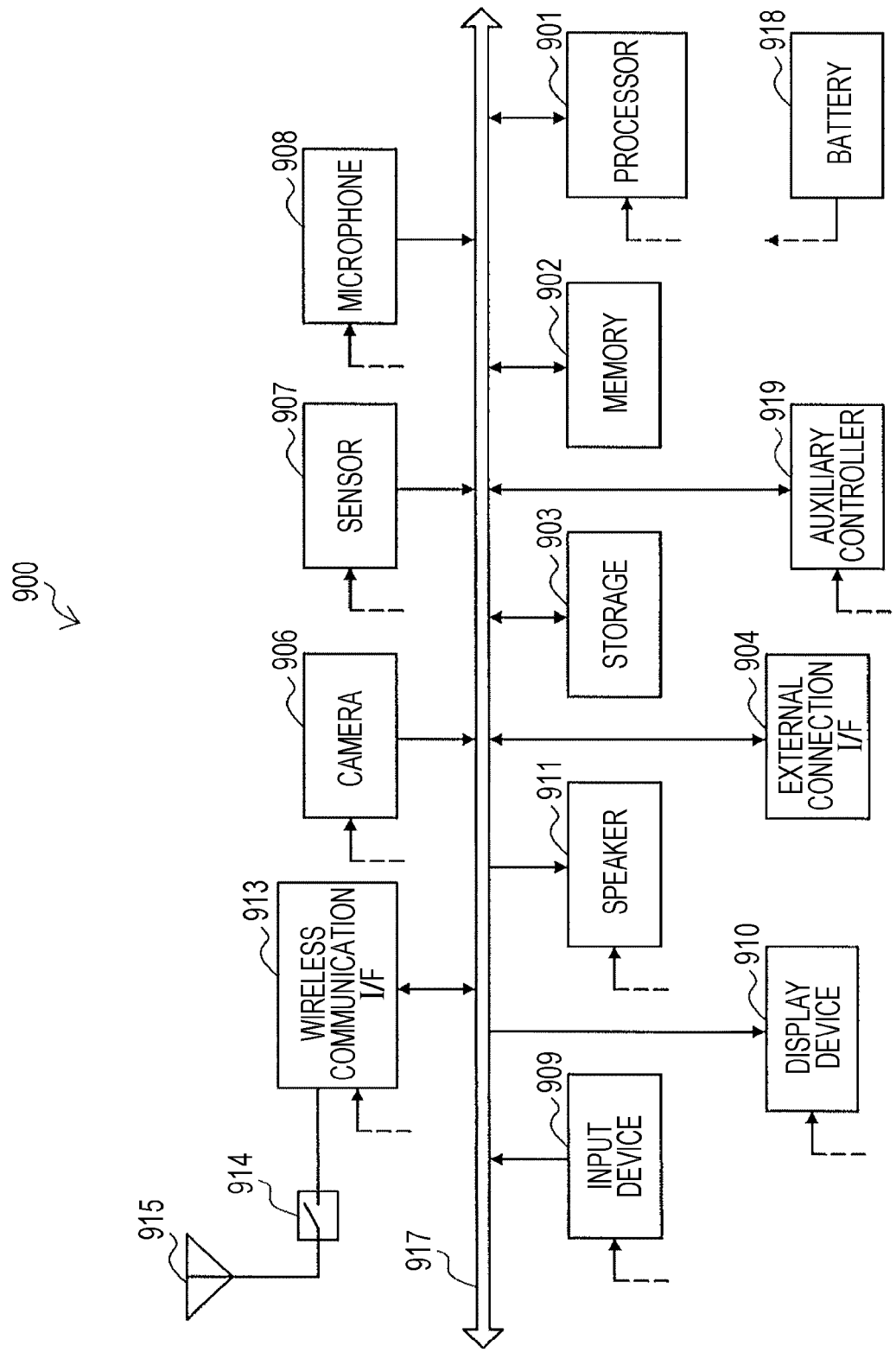
FIG. 20 is a block diagram illustrating an example of a schematic configuration of a smartphone.

FIG. 20 is a block diagram illustrating an example of a schematic configuration of a smartphone 900 to which a technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC) and controls functions of an application layer and a different layer of the smartphone 900. The memory 902 includes a random access memory (RAM) and a read only memory (ROM) and stores a program and data executed by the processor 901. The storage 903 may include a storage medium such as a semiconductor memory or a hard disk. The external connection interface 904 is an interface to connect an external device such as a memory card or a universal serial bus (USB) device to the smartphone 900.

The camera 906 includes, for example, an imaging element such as a charge coupled device (CCD) or a complementary metal oxide semiconductor (CMOS) and generates an imaged image. The sensor 907 may include, for example, a sensor group of a positioning sensor, a gyro sensor, a terrestrial magnetism sensor, an acceleration sensor, and the like. The microphone 908 converts a sound input into the smartphone 900 into a sound signal. The input device 909 includes, for example, a touch sensor to detect a touch on a screen of the display device 910, a keypad, a keyboard, a button, or a switch and receives operation or an information input from a user. The display device 910 includes a screen such as a liquid crystal display (LCD) or an organic light emitting diode (OLED) display, and displays an output image of the smartphone 900. The speaker 911 converts a sound signal output from the smartphone 900 into sound.

The wireless communication interface 913 supports one or more of wireless LAN standards such as IEEE 802.11a, 11b, 11g, 11n, 11ac, and 11ad and executes wireless communication. In an infrastructure mode, the wireless communication interface 913 may communicate with a different device through a wireless LAN access point. Also, in an ad hoc mode or a direct communication mode such as Wi-Fi Direct, the wireless communication interface 913 may directly communicate with a different device. Note that in Wi-Fi Direct, one of two terminals operates as an access point unlike the ad hoc mode. However, communication is performed between these terminals directly. Typically, the wireless communication interface 913 may include a baseband processor, a radio frequency (RF) circuit, a power amplifier, and the like. The wireless communication interface 913 may be a one-chip module in which a memory to store a communication control program, a processor to execute the program, and a related circuit are integrated. The wireless communication interface 913 may support, in addition to a wireless LAN system, a different kind of wireless communication system such as a near field communication system, a proximity wireless communication system, or a cellular communication system. The antenna switch 914 switches a connection destination of the antenna 915 between a plurality of circuits (such as circuit for different wireless communication system) included in the wireless communication interface 913. The antenna 915 includes one or a plurality of antenna elements (such as plurality of antenna element included in MIMO antenna) and is used for transmission/reception of a wireless signal performed by the wireless communication interface 913.

Note that the smartphone 900 is not limited to the example in FIG. 20 and may include a plurality of antennas (such as antenna for wireless LAN and antenna for proximity wireless communication system). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to each block in the smartphone 900 illustrated in FIG. 20 through a feed line partially indicated by a broken line in the drawing. The auxiliary controller 919 operates a minimum function of the smartphone 900, for example, in a sleep mode.

In the smartphone 900 illustrated in FIG. 20, the wireless communication unit 110 and the control unit 130 described with reference to FIG. 2, and the wireless communication unit 210 and the control unit 230 described with reference to FIG. 3 may be implemented in the wireless communication interface 913. Also, at least a part of these functions may be implemented in the processor 901 or the auxiliary controller 919.

Note that the smartphone 900 may operate as a wireless access point (software AP) by an access point function executed by the processor 901 in an application level. Also, the wireless communication interface 913 may have a wireless access point function.

2-2. Second Application Example

Figure 21:
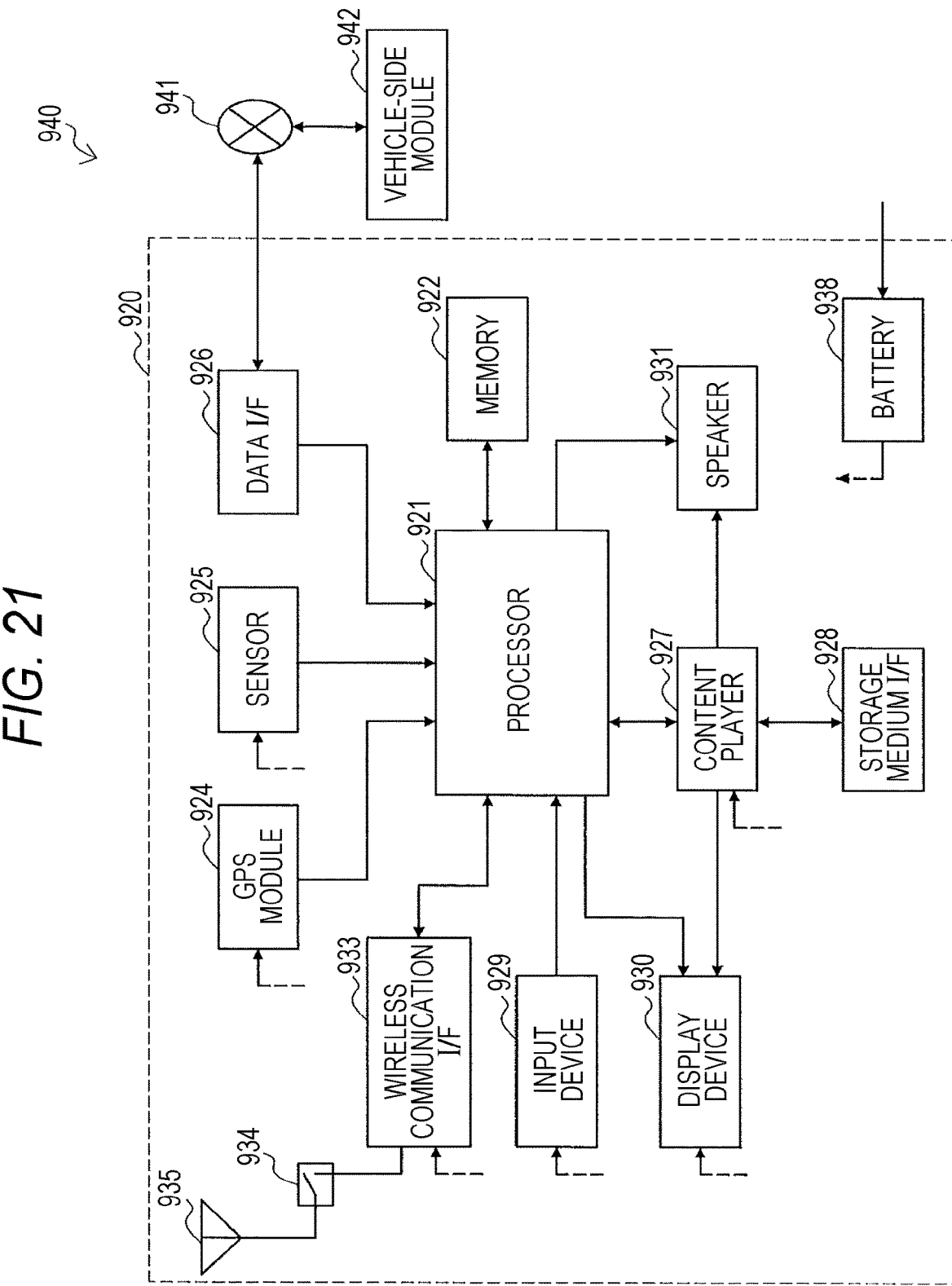
FIG. 21 is a block diagram illustrating an example of a schematic configuration of a car navigation apparatus.

FIG. 21 is a block diagram illustrating an example of a schematic configuration of a car navigation apparatus 920 to which a technology according to the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC and controls a navigation function and a different function of the car navigation apparatus 920. The memory 922 includes a RAM and a ROM and stores a program and data executed by the processor 921.

The GPS module 924 measures a position (such as latitude, longitude, and altitude) of the car navigation apparatus 920 by using a GPS signal received from a GPS satellite. The sensor 925 may include, for example, a sensor group of a gyro sensor, a terrestrial magnetism sensor, a barometric sensor, and the like. For example, the data interface 926 is connected to an in-vehicle network 941 through a terminal (not illustrated) and acquires data that is generated on a vehicle side and that is, for example, vehicle speed data.

The content player 927 reproduces content stored in a storage medium (such as CD or DVD) inserted into the storage medium interface 928. The input device 929 includes, for example, a touch sensor to detect a touch on a screen of the display device 930, a button, or a switch and receives operation or an information input from the user. The display device 930 includes a screen such as an LCD or OLED display and displays an image of a navigation function or content to be reproduced. The speaker 931 outputs a sound of a navigation function or content to be reproduced.

The wireless communication interface 933 supports one or more wireless LAN standards such as IEEE 802.11a, 11b, 11g, 11n, 11ac, and 11ad and executes wireless communication. In an infrastructure mode, the wireless communication interface 933 may communicate with a different device through a wireless LAN access point. Also, in an ad hoc mode or a direct communication mode such as Wi-Fi Direct, the wireless communication interface 933 may directly communicate with a different device. Typically, the wireless communication interface 933 may include a baseband processor, an RF circuit, a power amplifier, and the like. The wireless communication interface 933 may be a one-chip module in which a memory to store a communication control program, a processor to execute the program, and a related circuit are integrated. The wireless communication interface 933 may support, in addition to a wireless LAN system, a different kind of wireless communication system such as a near field communication system, a proximity wireless communication system, or a cellular communication system. The antenna switch 934 switches a connection destination of the antenna 935 between a plurality of circuits included in the wireless communication interface 933. The antenna 935 includes one or a plurality of antenna elements and is used for transmission/reception of a wireless signal performed by the wireless communication interface 933.

Note that the car navigation apparatus 920 is not limited to the example in FIG. 21 and may include a plurality of antennas. In this case, the antenna switch 934 may be omitted from the configuration of the car navigation apparatus 920.

The battery 938 supplies power to each block in the car navigation apparatus 920 illustrated in FIG. 21 through a feed line partially-indicated by a broken line in the drawing. Also, the battery 938 accumulates power fed from a vehicle side.

In the car navigation apparatus 920 illustrated in FIG. 21, the wireless communication unit 110 and the control unit 130 described with reference to FIG. 2, and the wireless communication unit 210 and the control unit 230 described with reference to FIG. 3 may be implemented in the wireless communication interface 933. Also, at least a part of these functions may be implemented in the processor 921.

Also, the wireless communication interface 933 may operate as the above-described information processing apparatus (master station) 100 and may provide wireless connection to a terminal held by a user on a vehicle.

Also, a technology according to the present disclosure may be realized as an in-vehicle system (or vehicle) 940 including one or more blocks of the above-described car navigation apparatus 920, the in-vehicle network 941, and a vehicle-side module 942. The vehicle-side module 942 generates vehicle-side data such as a vehicle speed, an engine speed, or trouble information and outputs the generated data to the in-vehicle network 941.

2-3. Third Application Example

Figure 22:
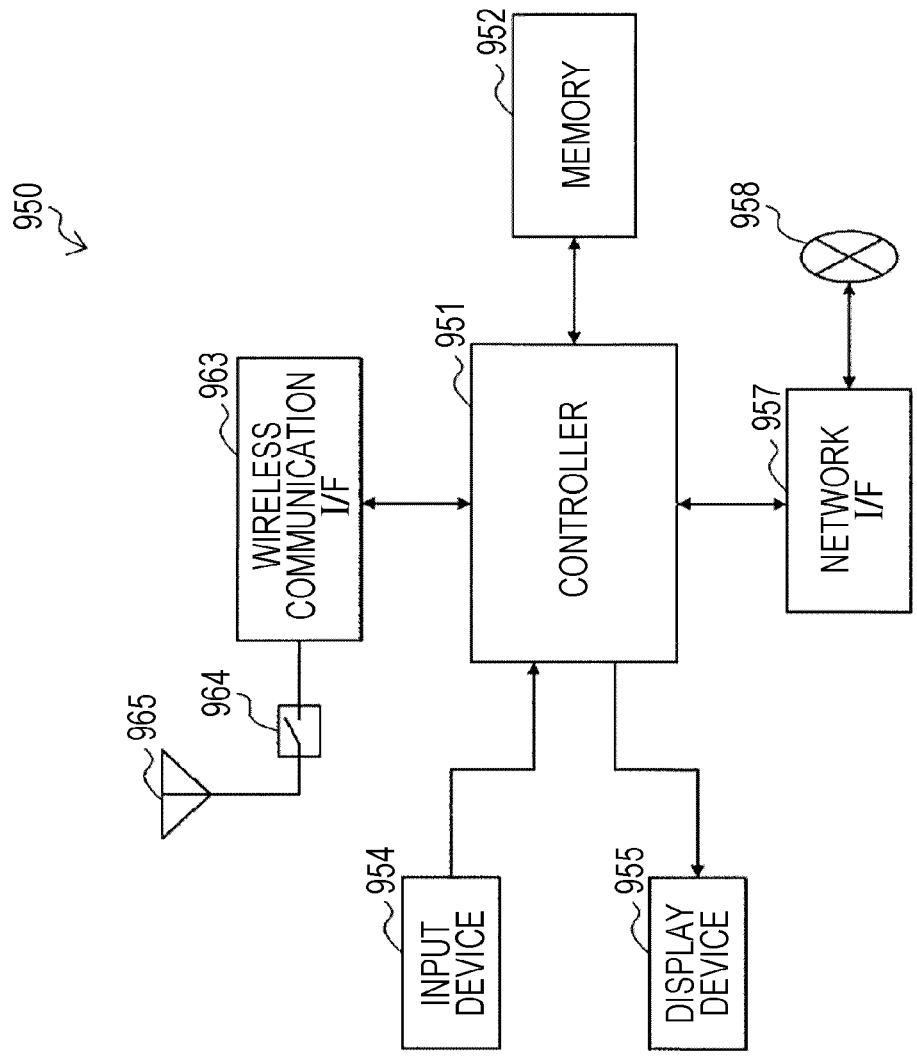
FIG. 22 is a block diagram illustrating an example of a schematic configuration of a wireless access point.

FIG. 22 is a block diagram illustrating an example of a schematic configuration of a wireless access point 950 to which a technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and operates various functions of an Internet protocol (IP) layer and a higher layer of the wireless access point 950 (such as access limitation, routing, encryption, firewall, and log management). The memory 952 includes a RAM and a ROM, and stores a program executed by the controller 951, and various kinds of control data (such as terminal list, routing table, encryption key, security setting, and log).

For example, the input device 954 includes a button or a switch, and receives operation from a user. The display device 955 includes an LED lamp and the like, and displays operation status of the wireless access point 950.

The network interface 957 is a wired communication interface for the wireless access point 950 to be connected to a wired communication network 958. The network interface 957 may include a plurality of connection terminals. The wired communication network 958 may be a LAN such as the Ethernet (registered trademark) or a wide area network (WAN).

The wireless communication interface 963 supports one or more of wireless LAN standards such as IEEE 802.11a, 11b, 11g, 11n, 11ac, and 11ad, and provides, as an access point, wireless connection to a terminal nearby. Typically, the wireless communication interface 963 may include a baseband processor, an RF circuit, a power amplifier, and the like. The wireless communication interface 963 may be a one-chip module in which a memory to store a communication control program, a processor to execute the program, and a related circuit are integrated. The antenna switch 964 switches a connection destination of the antenna 965 between a plurality of circuits included in the wireless communication interface 963. The antenna 965 includes one or a plurality of antenna elements and is used for transmission/reception of a wireless signal performed by the wireless communication interface 963.

In the wireless access point 950 illustrated in FIG. 22, the wireless communication unit 110 and the control unit 130 described with reference to FIG. 2 may be implemented in the wireless communication interface 963. Also, at least a part of these functions may be implemented in the controller 951.

Note that the above embodiment is described as an example to embody the present technology. Matters in the embodiment and matters specifying the invention in claims correspond to each other. Similarly, the matters specifying the invention in the claims and matters with names identical thereto in the embodiment of the present technology correspond to each other. However, the present technology is not limited to the embodiment and can be embodied by various modifications of the embodiment within the spirit and the scope thereof.

Also, the processing procedures described in the above embodiment may be considered as a method including a series of these procedures or may be considered as a program to cause a computer to execute a series of these procedures or a recording medium storing the program. As this recording medium, for example, a compact disc (CD), a MiniDisc (MD), a digital versatile disc (DVD), a memory card, or a Blu-ray (registered trade mark) disc can be used.

Note that an effect described in the present specification is just an example and not the limitation. Also, there may be a different effect.

Note that the present technology may include the following configuration.

(1) An information processing apparatus including: a control unit that performs, in a case of transmitting data by using wireless communication, control of performing transmission while including determination information with which a device in a transmission destination of the data determines in a data link layer whether to pass the data to a higher layer of the data link layer into the data.

(2)
The information processing apparatus according to (1), in which the control unit performs control of performing transmission while including the determination information into a frame designating a predetermined value in LLC/SNAP.

(3)
The information processing apparatus according to (1) or (2), in which the control unit performs control of performing transmission while adding a frame, which includes as the determination information a redundancy signal to perform error correction in the data link layer, to a data frame in which a frame including the data is coded in a unit of a MAC frame.

(4)
The information processing apparatus according to (3), in which the control unit performs control of performing transmission while including the redundancy signal into a frame designating a value, which indicates that the redundancy signal is included, in LLC/SNAP.

(5)
The information processing apparatus according to (3) or (4), in which the control unit performs control of performing transmission while including the redundancy signal into an action frame.

(6)
The information processing apparatus according to any one of (1) to (5), in which the control unit performs control of performing transmission while adding, in front of a frame to transmit the data, accompanying information that is information used in performance of error correction in the data link layer and that includes a coding method of a redundancy signal to perform the error correction in the data link layer, a coding rate of the redundancy signal, and object frame information to specify an object frame to be an object of the error correction in the data link layer.

(7)
The information processing apparatus according to (6), in which the control unit performs control of performing transmission while putting the determination information and the accompanying information into a queue of an access category that is the same with that of the object frame.

(8)
The information processing apparatus according to (6) or (7), in which the control unit performs control of performing transmission in the order of a frame including the accompanying information, the object frame, and a frame including the determination information.

(9)
The information processing apparatus according to any one of (1) to (8), in which the control unit performs control to perform wireless communication with the device in the transmission destination according to an IEEE 802.11 standard.

(10) An information processing apparatus including: a control unit that performs control of determining, in a case of receiving data by using wireless communication, whether to pass the data to a higher layer of a data link layer on the basis of determination information that is information included in the data and that can be grasped in the data link layer.

(11)
The information processing apparatus according to (10), in which the control unit acquires the determination information on the basis of a value designated by LLC/SNAP in a received frame.

(12)

The information processing apparatus according to (10) or (11), in which the control unit performs, in a case of determining to pass the data to the higher layer on the basis of the determination information, control of transmitting an acknowledgement for notification that the data is received correctly to a device of a transmission source which has transmitted the data.

(13)

The information processing apparatus according to any one of (10) to (12), in which the control unit performs, in a case where loss correction of the data is performed on the basis of the determination information, control of transmitting an acknowledgement for notification that the data is received correctly to a device of a transmission source which has transmitted the data.

(14) An information processing method including: a control procedure of performing transmission, in a case of transmitting data by using wireless communication, while including determination information with which a device in a transmission destination of the data determines in a data link layer whether to pass the data to a higher layer of the data link layer into the data.

(15) An information processing method including: a control procedure of determining, in a case of receiving data by using wireless communication, whether to pass the data to a higher layer of a data link layer on the basis of determination information that is information included in the data and that can be grasped in the data link layer.

(16) A program causing a computer to execute a control procedure of performing transmission, in a case of transmitting data by using wireless communication, while including determination information with which a device in a transmission destination of the data determines in a data link layer whether to pass the data to a higher layer of the data link layer into the data.

(17) A program causing a computer to execute a control procedure of determining, in a case of receiving data by using wireless communication, whether to pass the data to a higher layer of a data link layer on the basis of determination information that is information included in the data and that can be grasped in the data link layer.

REFERENCE SIGNS LIST

10 Communication system
100 Information processing apparatus (master station)
110 Wireless communication unit
120 Storage unit
130 Control unit
141 Antenna
142 RF receiver AD conversion unit
143 Guard interval removing unit
144 OFDM demodulation unit (FFT)
145 Demapping unit
146 Deinterleaving unit
147 L1 decoding unit
148 L1 frame (PPDU) decomposing unit
149 L2 data frame buffer
150 L2 FEC prior information frame decomposing unit
151 L2 FEC frame decomposing/L2 decoding unit
152 L2 data frame decomposing unit
200, 201 Information processing apparatus (slave station)
210 Wireless communication unit
220 Storage unit
230 Control unit
241 L2 data frame generating unit
242 L2 data frame buffer
243 L2 coding/L2 redundancy signal frame generating unit
244 L2 FEC prior information table generating/L2 FEC prior information frame generating unit
245 L1 frame (PPDU) generating unit
246 L1 coding unit
247 Interleaving unit
248 Mapping unit
249 OFDM modulation unit (IFFT)
250 Guard interval insertion unit
251 DA conversion RF transmitter
252 Antenna
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing apparatus comprising:
processing circuitry configured to:
generate a Media access control (MAC) frame, the MAC frame including data in a data field and determination information included in a logical link control (LLC)/subnetwork access protocol (SNAP) field, the determination information indicating whether a destination device should pass the data to a layer higher than a data link layer of the destination device without forward error correction (FEC) or redundancy error processing, or the destination device should store the data for FEC or redundancy error processing of a MAC frame to be transmitted in the future; and wirelessly transmit the MAC frame to the destination device.

2. The information processing apparatus according to claim 1, wherein the determination information comprises a predetermined payload value that corresponds to at least one of layer 2 (L2) FEC pre-information or L2 redundancy code information.

3. The information processing apparatus according to claim 2, wherein the L2 FEC pre-information includes a sequence number of first MAC frame, a number of MAC frames, an L2 FEC coding scheme index and a length of a code word.

4. The information processing apparatus according to claim 3, wherein the L2 FEC coding scheme index corresponds to one of a Reed-Solomon code or a Bose-Chaudhuri-Hocquenghem (BCH) code.

5. The information processing apparatus according to claim 1, wherein the MAC frame includes a MAC header followed by the LLC/SNAP field followed by the data field.

6. A wireless communications method performed by circuitry of an information processing apparatus, the method comprising:

generating a Media access control (MAC) frame, the MAC frame including data in a data field and determination information included in a logical link control (LLC)/subnetwork access protocol (SNAP) field, the determination information indicating whether a destination device should pass the data to a layer higher than a data link layer of the destination device without forward error correction (FEC) or redundancy error processing, or the destination device should store the data for FEC or redundancy error processing of a MAC frame to be transmitted in the future; and wirelessly transmitting the MAC frame to the destination device.

* * * * *